United States Patent
Nishimoto

[11] Patent Number: 5,989,371
[45] Date of Patent: Nov. 23, 1999

[54] VACUUM HEAT-INSULATING PANEL AND METHOD FOR PRODUCING THE SAME

[75] Inventor: Yoshio Nishimoto, Tokyo, Japan

[73] Assignee: Mitsubishi Denki Kabushiki Kaisha, Tokyo, Japan

[21] Appl. No.: 08/991,776

[22] Filed: Dec. 16, 1997

[30] Foreign Application Priority Data

| Feb. 27, 1997 | [JP] | Japan | 9-043131 |
| Feb. 27, 1997 | [JP] | Japan | 9-043133 |
| Jul. 18, 1997 | [JP] | Japan | 9-193809 |

[51] Int. Cl.⁶ .......... B29C 43/02; B32B 31/16; F16L 59/02
[52] U.S. Cl. .......... 156/73.6; 156/153; 156/245; 156/283; 156/286; 156/287; 264/36.11; 264/69; 264/102; 264/109
[58] Field of Search .......... 156/73.6, 153, 156/276, 283, 286, 287, 245; 264/69, 102, 109, 112, 36.11; 53/408

[56] References Cited

U.S. PATENT DOCUMENTS

| 5,010,112 | 4/1991 | Glicksman et al. | 521/76 |
| 5,076,984 | 12/1991 | Bisplinghoff et al. | 264/102 |
| 5,137,787 | 8/1992 | Shepherd | 428/423.7 |
| 5,364,577 | 11/1994 | Cur et al. | 264/69 |
| 5,375,631 | 12/1994 | Mochizuki | 141/7 |
| 5,525,278 | 6/1996 | Krosch et al. | 264/45.3 |
| 5,846,357 | 12/1998 | Meteer et al. | 156/77 |

FOREIGN PATENT DOCUMENTS 9-194716  7/1997  Japan.

*Primary Examiner*—Richard Crispino
*Attorney, Agent, or Firm*—Oblon, Spivak, McClelland, Maier & Neustadt, P.C.

[57] ABSTRACT

A vacuum heat-insulating panel includes: a porous core material formed from a mixture containing plastic foam powder and a filler in the form of flakes or a porous core material formed from a mixture containing plastic foam powder and thermoplastic resin powder; and a packaging material for packaging the core material, the inside of the package material being kept in a vacuum, the core material holding its shape. Rigid polyurethane foam may be used as the plastic foam. Mica flakes, plastic films each coated with thin metal film, metal foil or the like may be used as the filler. Styrene resin may be used as the thermoplastic resin.

13 Claims, 9 Drawing Sheets

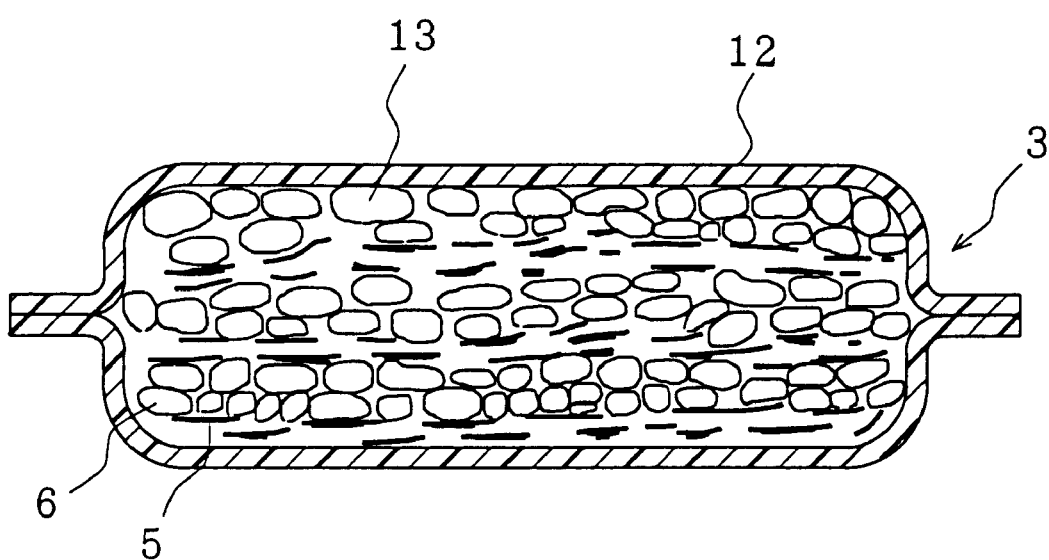
F I G. 1

NOTE) PUF/-141b:HCFC141b-FOAMING RIGID POLYURETHANE FORM
PUF/C-PENTANE :CYCLOPENTANE-FOAMING RIGID POLYURETHANE FORM
PUF/HFC:HYDROFLUOROCARBON-FOAMING RIGID POLYURETHANE FOAM
VIP:VACUUM HEAT INSULATING PANEL

VACUUM HEAT-INSULATING PANEL AND METHOD FOR PRODUCING THE SAME

BACKGROUND OF THE INVENTION

1. Field of the Invention

The present invention relates to a vacuum heat-insulating panel used as a heat insulating material, in a gap formed between a molded product of metal thin plate and a resin molded product, on a wall surface which is required to be heat-insulated, for example, in a refrigerator, a cold reserving car or the like, and a method for producing such a vacuum heat-insulating panel.

2. Description of the Related Art

Recently, in order to protect terrestrial environment, restricted use regulation has been imposed on chlorofluorocarbons for the purpose of suppressing the ozone-layer depletion ratio, and even on hydrochlorofluorocarbons which can suppress the ozone-layer depletion ratio to $1/10$ or less in comparison to chlorofluorocarbons. Accordingly, a heat insulating system capable of improving the heat insulating property without using any blowing agent and capable of recovering and recycling used materials will be required socially in the future.

Conventionally, in a heat insulator wall of a refrigerator, a cold reserving car or the like, rigid polyurethane foam is injected into a gap formed between an outer housing product molded of a metal thin-plate such as an iron plate, and an interior part of a resin-sheet molded product so as to fill the gap with the rigid polyurethane foam.

Although 1,1-dichloro-1-fluoroethane which is one of the hydrochlorofluorocarbons capable of providing excellent heat insulating property has been used as a blowing agent for rigid urethane foam which is a heat insulating material, use of hydrofluorocarbons or hydrocarbons the molecules of which contain no chlorine which causes ozone-layer depletion has been proposed in recent years. For example, JP-A-2-235982 discloses a method for producing rigid polyurethane foam in which hydrofluorocarbons such as 1,1,1,3,3-pentafluoropropane (hereinafter referred to as HFC-245fa), 1,1,1,4,4,4-hexafluorobutane (hereinafter referred to as HFC-356mff), etc. are used as a blowing agent, and JP-A-3-152160 discloses a method for producing rigid polyurethane foam in which hydrocarbons such as cyclopentane, etc. are used as a blowing agent. When such a kind of rigid polyurethane foam is applied to a refrigerator or the like, however, the heat insulating property is in a range from 17 to 20 mw/mK.

In addition to disuse of materials causing ozone-layer depletion and effective use of resources by recycling or the like, reduction of electric energy consumption is also required for heat/cold retaining apparatuses such as a refrigerator, etc. The aforementioned rigid polyurethane foam which uses an existing blowing agent free from ozone-layer depletion has however a limit in its heat insulating property. Therefore, a technique has been newly proposed for applying a vacuum heat-insulating panel that has heat insulating property twice or more as much as that of the conventional rigid polyurethane foam.

FIG. 11 is a diagram of comparison of heat insulating materials. It is apparent from FIG. 11 that the heat insulating property of the vacuum heat-insulating panel (VIP) is twice or more as much as that in the case of use of HCFC141b-foaming rigid urethane foam (PUF/-141b), cyclopentan-foaming rigid polyurethane foam (PUF/-C-Pentane) and hydrofluorocarbon-foaming rigid polyurethane foam (PUF/-HFC).

For example, JP-A-60-243471 has proposed a heat insulating box having a board disposed in its wall, the board being made by putting pulverized rigid polyurethane foam (PUF) into a synthetic resin bag and vacuum-packing it in a form of a board, and JP-A-60-60483 has proposed a setting method of a vacuum heat-insulating panel in which a gap permitting PUF to flow is provided in the flange side of a side plate.

Each of the proposed vacuum heat-insulating panels and other general vacuum heat-insulating panels is shaped like a board having a thickness in a range from 10 to 20 mm. These panels are installed in walls of a refrigerator.

For production of a refrigerator having a vacuum heat-insulating panel installed therein, an inner box is inserted into an outer box having a vacuum heat-insulating panel stuck thereon so as to assemble a box structure together with other members. Next, rigid polyurethane foam is injected between the outer and inner boxes to thereby form a heat insulating layer, and then interior parts and refrigerant circuit parts are attached to the box structure to complete a product.

Accordingly, a core material for a heat-insulating panel needs basic properties of: having a predetermined strength for holding the shape of the panel in a vacuum state; and suppressing the quantity of heat conducted through a substance constituting the core material (heat conduction) and the quantity of heat transmitted through the substance (heat radiation).

As proposals to obtain the aforementioned properties, for example, JP-A-60-205164 teaches application of rigid urethane foam comprising open cells communicated with each other, as a core material of a vacuum heat-insulating panel, JP-A-60-71881 teaches application of pearlite powder as a core material of a vacuum heat-insulating panel, JP-A-4-218540 teaches application of a plate-like molded product obtained by sintering thermoplastic urethane resin powder in a mold as a core material of a vacuum heat-insulating panel, and JP-A-7-96580 teaches application of a board comprising long glass fiber, fibrillated resin fiber and inorganic fine powder, as a core material of a vacuum heat-insulating panel. Among those materials, communicated open-cell rigid urethane foam, light in weight, excellent in mass-productivity, and excellent in handling property at the time of production, for example, at the time of inserting a core material into a packaging material of a vacuum heat-insulating panel, has been used as a core material.

Further, for improving heat insulating property, such heat insulating mechanisms are effective so that: a substance of low heat conduction is used for constituent materials, contact areas between the materials are reduced to thereby reduce the heat conduction area; heat conduction is controlled to be in a planar direction perpendicular to the heat insulating direction (the direction of the thickness) to thereby suppress the heat conduction through a substance in the heat insulating direction; and a substance having high ability to reflect heat is mixed to thereby reduce heat radiation. Further, to achieve improvement of heat insulating property, JP-A-62-13979 teaches one to bury metal foil or metal vapor deposition film excellent in effect of shielding from heat radiation, and JP-A-63-135694 teaches one to use PUF mixed with fine powder such as calcium silicate or the like.

In order to mix a granular substance of calcium silicate or the like as a filler, for the purpose of suppressing heat radiation, a considerably large quantity of the granular substance is required. Accordingly, weight increases.

Further, since the heat conductivity of such a filler is high, heat insulating property is not improved sufficiently. Further, even in a core material containing metal foil disposed therein, heat conduction is not attenuated though it is limited only in the planar direction. Accordingly, there is no effect for suppressing heat conduction between the constituent materials. Further, if the pulverized rigid polyurethane foam described in JP-A-60-243471 is used as it is, such handling difficulties are caused as difficult insertion of the pulverized rigid polyurethane foam into the vacuum heat-insulating panel, large volume reduction of the pulverized rigid polyurethane foam in a packaging bag after evacuating the inside of the packaging bag into a vacuum state and so on.

BRIEF SUMMARY OF THE INVENTION

The present invention has been achieved to solve the above problems, and an object of the present invention is to provide a vacuum heat-insulating panel having heat insulating property more excellent than that of a conventional vacuum heat-insulating panel using glass mat or communicated open-cell rigid urethane foam as a core material, and also excellent handling property and strength.

A further object of the present invention is to provide a refrigerator which is low in electric energy consumption and easy in assembling work, using such a vacuum heat-insulating panel.

In order to achieve the above objects, according to a first aspect of the present invention, there is provided a vacuum heat-insulating panel comprising: a porous core material formed from a mixture containing plastic foam powder and plate-like filler; and a packaging material for packaging the core material to keep the inside of the package in a vacuum, wherein the core material holds the shape of the vacuum heat-insulating panel.

According to a second aspect of the present invention, in the above vacuum heat-insulating panel, the plastic foam powder is pulverized rigid polyurethane foam.

According to the first and second aspects of the present invention, a core material in a form suitable for suppressing heat radiation is obtained so that a vacuum heat-insulating panel having excellent heat insulating property can be obtained.

According to a third aspect of the present invention, in the above vacuum heat-insulating panel, the core material is a molded product in which a layer mainly containing the pulverized rigid polyurethane foam and a layer mainly containing the plate-like filler are formed separately from each other.

According to the third aspect of the present invention, the core material is separated into different layers, so that the heat insulating property of the vacuum heat-insulating panel is improved.

According to a fourth aspect of the present invention, in the above vacuum heat-insulating panel, the plate-like filler is arranged perpendicularly to a heat insulating direction.

According to the fourth aspect of the present invention, heat insulation is further improved in the heat insulating direction of the vacuum heat-insulating panel.

According to a fifth aspect of the present invention, in the above vacuum heat-insulating panel, the plate-like filler is formed from one member selected from the group consisting of mica flakes, plastic film coated with metal thin-film, and metal foil.

According to a sixth aspect of the present invention, in the above vacuum heat-insulating panel, the plate-like filler holds inorganic or organic fine particles on its surface.

According to the fifth and sixth aspects of the present invention, the quantity of heat conducted through the plate-like filler is suppressed so that the heat insulating property of the heat insulating panel is improved.

According to a seventh aspect of the present invention, there is provided a method for producing a vacuum heat-insulating panel, comprising the steps of: preparing a core material by compression molding of a mixture containing plastic foam powder and plate-like filler; inserting the core material into a packaging material; and sealing, in a vacuum, the packaging material.

According to an eighth aspect of the present invention, in the above method for producing a vacuum heat-insulating panel, the plastic foam powder is pulverized rigid polyurethane foam.

According to the seventh and eighth aspects of the present invention, a vacuum heat-insulating panel excellent both in the heat insulating property and strength characteristic can be obtained.

According to a ninth aspect of the present invention, in the above method for producing a vacuum heat-insulating panel, the pulverized rigid polyurethane foam is produced by pulverization of rigid polyurethane foam into particles, at a temperature not lower than the glass transition point of rigid polyurethane foam.

According to a tenth aspect of the present invention, in the above method for producing a vacuum heat-insulating panel, the pulverization of rigid polyurethane foam is performed under heating in a vacuum atmosphere.

According to an eleventh aspect of the present invention, in the above method for producing a vacuum heat-insulating panel, each particle of the pulverized rigid polyurethane foam has a size not smaller than the cell size of the rigid polyurethane foam and not larger than three times as large as the cell size.

According to the ninth, tenth and eleventh aspects of the present invention, communication of independent cells in the pulverized rigid polyurethane foam can be achieved easily. Accordingly, worsening of the heat insulating property due to lowering of the degree of vacuum of the vacuum heat-insulating panel caused by remaining gas in the cells can be prevented.

According to a twelfth aspect of the present invention, in the above method for producing a vacuum heat-insulating panel, particles of the pulverized rigid polyurethane foam and the plate-like filler are stuck to each other by an adhesive agent of powder-like thermosetting resin with low melting viscosity or thermoplastic resin.

According to the twelfth aspect of the present invention, the core material can be produced easily by a small amount of an adhesive agent, so that pulverized particles of the rigid polyurethane foam can be welded without blockage of communicated open-cells in the pulverized rigid polyurethane foam.

According to a thirteenth aspect of the present invention, in the above method for producing a vacuum heat-insulating panel, the compression molding is performed at a temperature not lower than the glass transition point of rigid polyurethane foam and under a compression pressure in a range from 0.7 to 2.0 kg/cm$^2$.

According to the thirteenth aspect of the present invention, deformation of cells and communication of independent cells can be achieved, so that the heat insulating property of the vacuum heat-insulating panel can be improved.

According to a fourteenth aspect of the present invention, in the above vacuum heat-insulating panel, the plate-like filler of the first aspect is replaced by thermoplastic resin powder.

According to a fifteenth aspect of the present invention, in the above vacuum heat-insulating panel, the plastic foam powder is pulverized rigid polyurethane foam, and the thermoplastic resin powder is pulverized styrene resin.

According to the fourteenth and fifteenth aspects of the present invention, a vacuum heat-insulating panel having excellent heat insulating property can be obtained.

According to a sixteenth aspect of the present invention, there is provided a method for producing a vacuum heat-insulating panel, comprising the steps of: preparing a core material by compression molding a mixture of plastic foam powder and thermoplastic resin powder after being substantially uniformly mixed; inserting the core material into a packaging material; and sealing, in a vacuum, the packaging material.

According to a seventeenth aspect of the present invention, in the above method for producing a vacuum heat-insulating panel, the plastic foam powder is pulverized rigid polyurethane foam, and the thermoplastic resin powder is pulverized styrene resin.

According to the sixteenth and seventeenth aspects of the present invention, a vacuum heat-insulating panel having excellent heat insulating property can be obtained efficiently and easily.

According to an eighteenth aspect of the present invention, in the above method for producing a vacuum heat-insulating panel, the compression molding is performed at a temperature not lower than the glass transition point of the rigid polyurethane foam and not lower than the melting point of the thermoplastic resin.

According to the eighteenth aspect of the present invention, not only a vacuum heat-insulating panel can be obtained efficiently and easily but also sufficient gaps can be secured in a layer mainly containing rigid polyurethane foam.

According to a nineteenth aspect of the present invention, in the above method for producing a vacuum heat-insulating panel, the plastic foam powder has a particle size not smaller than the cell size of the plastic foam and not larger than three times as large as the cell size, and the thermoplastic resin powder has a particle size not smaller than the cell size of the plastic foam.

According to the nineteenth aspect of the present invention, not only a molded product having no independent cell can be obtained but also the pulverized particles of the rigid polyurethane foam can be welded to one another without blocking the communicated open-cells, so that lowering of heat insulating property caused by leakage of remaining gas in the cells can be prevented.

According to a twentieth aspect of the present invention, in the above method for producing a vacuum heat-insulating panel, the compression molding is performed in a vacuum atmosphere and under a compression pressure in a range from 0.1 to 1.2 kg/cm².

According to the twentieth aspect of the present invention, a vacuum heat-insulating panel excellent in the strength characteristic and heat insulating property can be obtained.

In addition, according to the present invention, not only a heat insulating material collected from a waste refrigerator or the like can be used as plastic foam but also an inner box material collected from the waste refrigerator or the like can be used as thermoplastic resin, so that effective use of resources can be made.

BRIEF DESCRIPTION OF THE DRAWINGS

FIG. 1 is a sectional view of a vacuum heat-insulating panel according to the present invention;

DESCRIPTION OF THE PREFERRED EMBODIMENTS

EMBODIMENT 1

Figure 2:
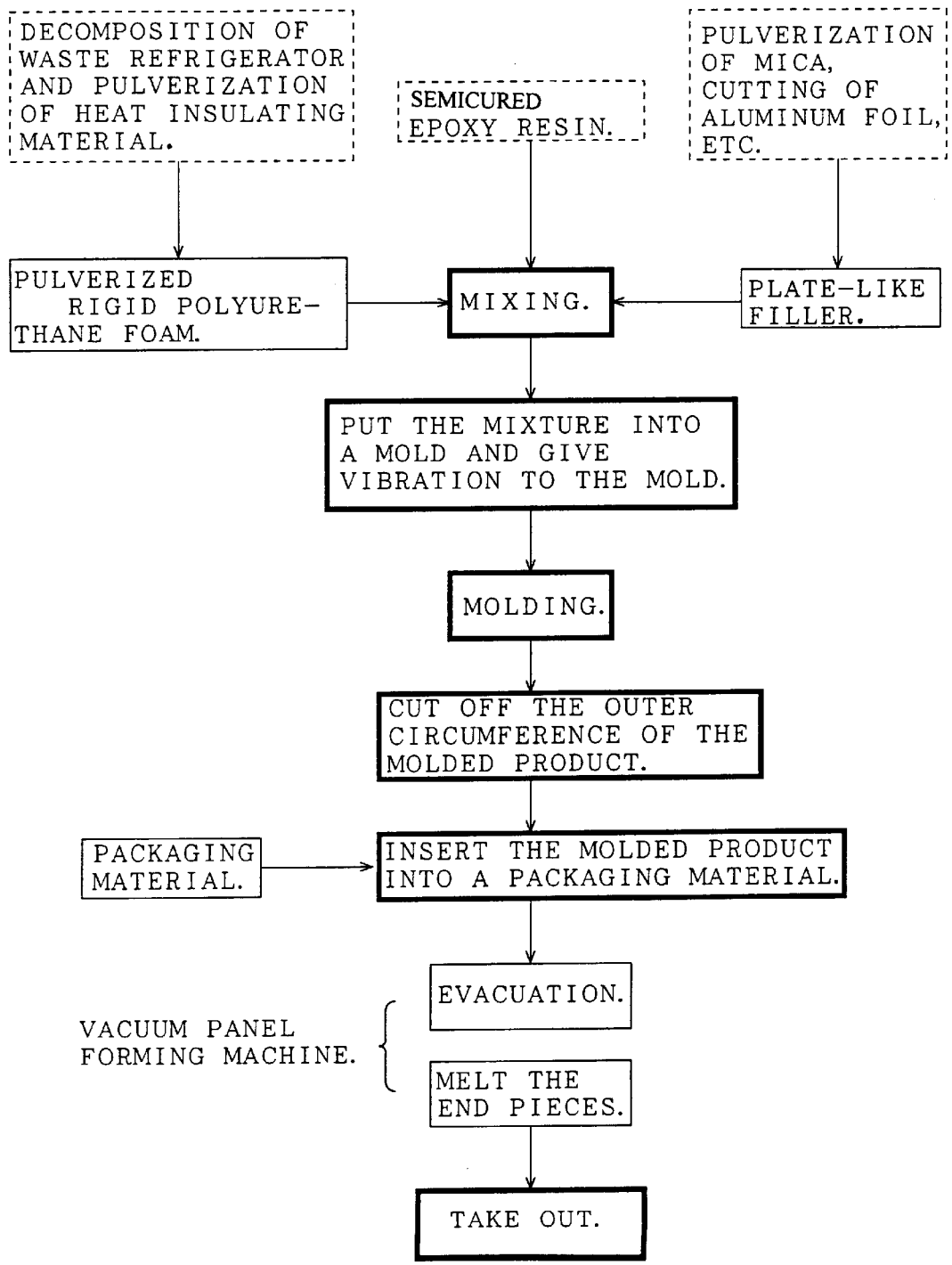
FIG. 2 is a flow chart showing a process for producing the vacuum heat-insulating panel depicted in FIG. 1.

As shown in FIG. 1, a vacuum heat-insulating panel 3 is obtained through a process in which plate-like filler 5 of an inorganic substance such as metal, mica or the like excellent in heat reflection factor and pulverized rigid polyurethane foam 6 are bonded by an adhesive agent to thereby form a core material 13, and the core material 13 is inserted into a packaging material 12 which is then sealed in a vacuum. Incidentally, powder of another plastic foam processed in the same shape may be used in place of the pulverized rigid polyurethane foam.

As described above, the core material 13 is a porous material covered with the packaging material 12. The inside of the packaging material 12 is kept in a vacuum and the shape of the vacuum heat-insulating panel 3 is held by the core material 13.

Further, the core material 13 is separated into layers mainly containing the pulverized rigid polyurethane foam 6 and layers mainly containing the plate-like filler 5. FIG. 1 shows the core material configured into three couples of layers.

(1) Production of Core Material

A method for producing a core material containing mica as plate-like filler, molded in a form of a board will be described below. Incidentally, this method corresponds to the first half of the flow chart showing a vacuum heat-insulating panel producing process shown in FIG. 2. This method will be described along with the flow chart of FIG. 2.

(a) Preparation of Plate-like Filler

It is important for the plate-like filler according to the present invention to be excellent in heat reflection property as a required function. Accordingly, a high-density material such as an inorganic substance, a metal or the like is preferable as the material for the plate-like filler. Considering the price reflecting easiness to form plate-like filler, aluminum foil or mica is most preferable. Even in the case of a plastic film which is a low-density substance, the same effect as described above can be obtained if the plastic film is coated with a thin film of a metal such as aluminum. Further, inorganic or organic fine particles may be held on the surface of the plate-like filler so as to suppress the quantity of heat conducted through the plate-like filler with a large heat conductivity.

Here, an example in which mica is used in the form of flakes will be described. Mica is pulverized by means of a pulverizer into particles having a diameter not smaller than 0.1 mm, preferably a diameter in a range from 0.5 mm to 5 mm, particularly preferably a diameter of about 2 mm. If the diameter of the pulverized particles of mica is smaller than 0.1 mm, the pulverized particles of mica may get into open cells of rigid polyurethane foam to thereby hinder orientation of the plate-like filler as will be described later. Further, if a high-speed water stream by water jetting is applied to the pulverization in this occasion, the pulverization and interlayer separation are performed simultaneously so that thinner flake-like mica can be obtained preferably.

(b) Preparation of Pulverized Rigid Polyurethane Foam

Pulverized rigid polyurethane foam which is a heat insulating material collected at the time of the disposal of refrigerators or the like is used most suitably for this purpose. In the case where the shape or characteristic of such a pulverized material is unsuitable or unavailable, a material separately pulverized by means of a pulverizer is used. Because independent cells remain as they are in the collected pulverized material, it is sometimes necessary to finely pulverize the collected pulverized material into fine powder in order to destroy cell membranes constituting the cells. The size of the fine powder of the rigid polyurethane foam may be substantially equal to the cell size. If the rigid polyurethane foam is pulverized at a temperature not lower than the glass transition point of the resin constituting the rigid polyurethane foam and under a vacuum condition, cell membranes may be destroyed to achieve the discharge of blowing gas in the cells and communication of the neighboring cells into open cells, even in the case where the pulverized particle size of the rigid polyurethane foam fine powder is about 1 mm which is about three times as large as the cell size. Pulverized particles of rigid polyurethane foam are filtered by a sieve or the like, so that pulverized particles having a preferred size in a range from the cell size to a size three times as large as the cell size are selected to be used.

(c) Adhesive Agent

The adhesive agent which is used for fixing the plate-like filler and the pulverized rigid polyurethane foam to mold them into the form of a board is required to keep the properties of powder so as not to hinder the mixing of raw materials and the orientation of the plate-like filler. Therefore, it is effective to use an adhesive agent which has such a property that the adhesive agent is melted by heat applied at the time of compression molding into the form of a board.

As for the adhesive agent having the aforementioned property, there are a method using a thermosetting resin such as epoxy resin, polyester resin or the like which is kept in a semicured state and a method using powder of a thermoplastic resin such as polyolefin, nylon or the like.

In either of the methods, it is necessary to use low melting viscosity powder of only resin containing no solvent. Here, epoxy resin fine powder in a semicured state is used. This powder is required to have a sufficient quantity to spread all over contact points between the pulverized particles of the rigid polyurethane foam and the plate-like filler on one hand, while this powder is required to have an ability of being solidified with a quantity as small as possible in order to keep gaps defined by the respective particles. The size of this powder is preferably not larger than 10 $\mu$m, particularly preferably not larger than 1 $\mu$m.

(d) Mixing of Raw Materials

After being put into a rotary-blade type mixer vessel, a drum type mixer vessel or the like, the aforementioned plate-like filler, pulverized rigid polyurethane foam and adhesive agent are mixed sufficiently. On this occasion, a suppression effect of heat radiation is obtained even in the case where the layer mainly containing the plate-like filler is very thin. Accordingly, since the increase of the thickness of the layer mainly containing rigid polyurethane foam for suppressing heat conduction between substrates is effective in obtaining excellent heat insulating property of the vacuum heat-insulating panel, the content of the rigid polyurethane foam is preferably made so as to be not smaller than 90% by volume.

Further, it is preferable that friction is generated between the materials by the mixing of the materials to make the powder-like materials rub one another so that particularly the fine powder of the adhesive agent, for example, semicured epoxy resin used in this embodiment, is deposited on other pulverized particles of rigid polyurethane foam and plate-like filler such as mica and particularly fine powder of the pulverized rigid polyurethane foam is deposited on the surface of the plate-like filler in a stable state.

(e) Putting the Mixture into Mold and Giving Vibration

After a necessary amount of the aforementioned mixture uniformly mixed is put into a mold for compression molding, fine vibration is given thereto. The plate-like filler heavy in specific gravity is deposited at the bottom surface of the mold by the fine vibration and oriented in the planar direction.

Figure 3:
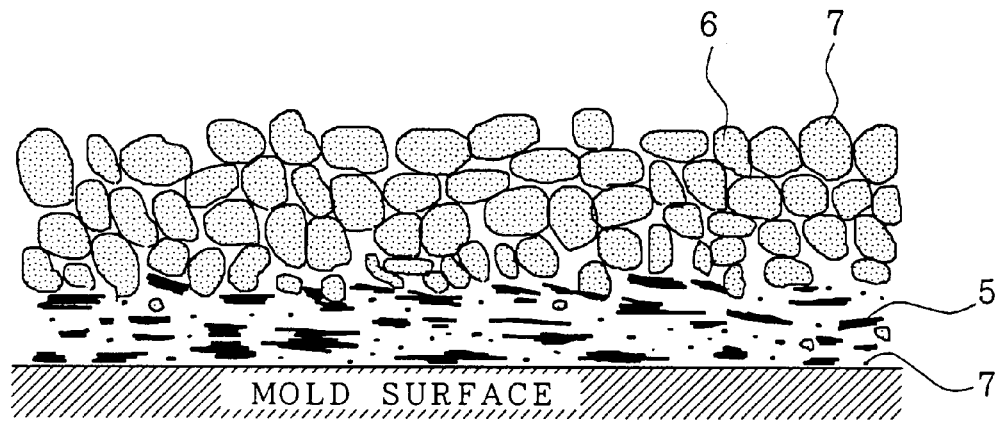
FIG. 3 is a conceptual view showing a state in which pulverized rigid polyurethane foam and plate-like filler constituting the vacuum heat-insulating panel are distributed in a mold.

By the series of operations, a complex structure is obtained as shown in FIG. 3 in which a layer mainly containing the plate-like filler oriented in the planar direction and a layer mainly containing the rigid polyurethane foam are formed separately from each other. Further, during the previous mixing, the adhesive agent is deposited on the surface of the plate-like filler and rigid polyurethane foam and fine powder of the rigid polyurethane foam is deposited on the surface of the plate-like filler to obtain a state in which the particles of the plate-like filler are prevented from coming into direct contact with each other.

The layer mainly containing the rigid polyurethane foam is composed of nearly 90% by weight of the rigid polyurethane foam. The layer mainly containing the plate-like filler is composed of nearly 100% by weight of the plate-like filler.

(f) Molding of Core Material

The pulverized rigid polyurethane foam and plate-like filler respectively having the semicured epoxy resin as the adhesive agent deposited on the surface thereof are molded into the form of a board as a core material by compression molding under pressure near the atmospheric pressure. In this case, the curing condition suitable for reaction of the resin, that is, temperature, time, and the setting value of pressure to be kept at the time of molding the materials put between hot plates into the form of a board are important. In this case, the curing condition varies in accordance with the composition of the resin. In the case of a general epoxy resin, molding is completed in one hour at a temperature in a range from 120 to 180° C. The most important matter in this process is compression pressure. The compression pressure is, preferably, in a range from 0.7 to 2.0 kg/cm$^2$, particularly preferably in a range from 1.4 to 2.0 kg/cm$^2$.

This pressure is compression pressure not smaller than the atmospheric pressure which will be applied to the core material left in a vacuum atmosphere in a packaging material as described later.

Although the semicured epoxy resin has been described as an example, it is a matter of course that curing time is not required in the case where a thermoplastic resin is used as the adhesive agent and that mold releasing can be made when the temperature of the molded product is reduced by the cooling of the mold to a point not higher than the thermal deformation temperature of the adhesive agent.

After the core material is molded, the outer circumference of the core material is cut to make a piece having a predetermined size.

(2) Production of Vacuum Heat-Insulating Panel

The core material having its outer circumference cut is inserted into an aluminum-laminated packaging material of a multi-layer sheet having a self-welding layer, and then an insertion opening of the packaging material is thermally sealed in a vacuum atmosphere.

Incidentally, the method for producing a vacuum heat-insulating panel corresponds to the second half of the flow chart in FIG. 2 showing the vacuum heat-insulating panel producing process, and the description will be made along with the flow chart of FIG. 2.

The core material prepared by cutting into a piece of a desired size to obtain a predetermined surface size is used. Pieces of the core material are stuck to one another so as not only to ensure the necessary thickness of the core material but also to improve the efficiency of radiation heat insulation by means of a plurality of plate-like filler layers.

Figure 4:
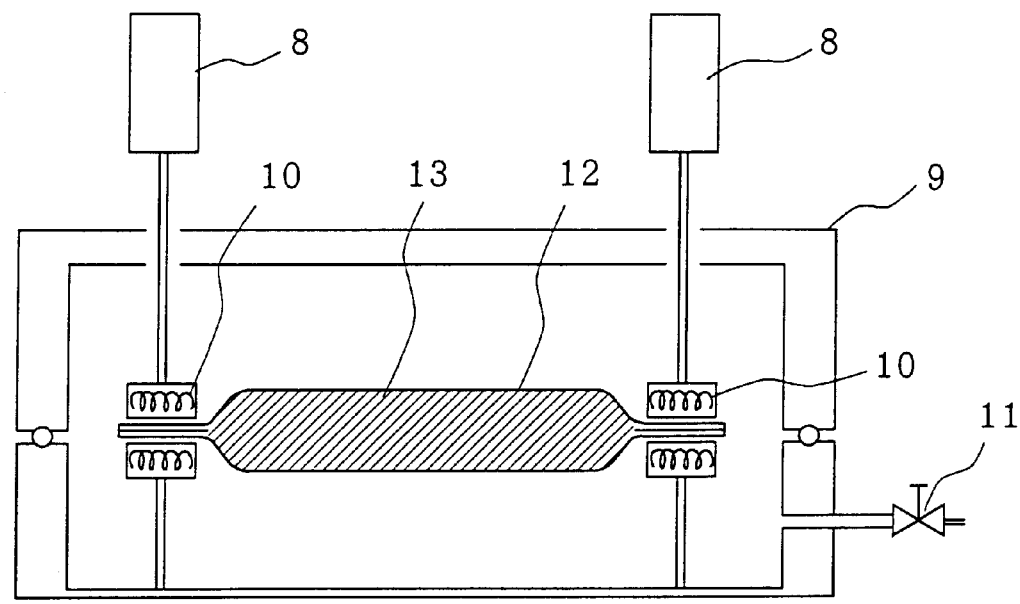
FIG. 4 is a conceptual view showing the structure of an apparatus for heat-sealing the vacuum heat-insulating panel.

As samples used for various evaluations including heat insulating property and so on, the core material was inserted into a packaging material heat-sealed on three edge sides in advance, and then charged in such a heat sealing apparatus as shown in FIG. 4 so that a remaining one edge side of the packaging material was heat-sealed in an atmosphere kept in a predetermined degree of vacuum. The degree of vacuum was selected to be an arbitrary value in a range from $10^0$ to $10^{-3}$ Torr.

The packaging material used is a multi-layer sheet having a sealing surface formed from a thermoplastic resin capable of being thermally bonded for welding, an intermediate layer formed from metal foil such as aluminum foil in order to perfectly cut off penetration of outside air, and an outermost layer formed from a resin having durability against scratching or the like.

For the vacuum heat-insulating panel, the core material having the thickness of 20 mm and the surface size of 180×180 mm was used.

Further, the core material and packaging material were used after being dried at a temperature not lower than 100° C.

As described above, in the vacuum heat-insulating panel according to the present invention, plate-like filler excellent in radiation heat shielding effect is laminated on rigid polyurethane foam. Accordingly, even in the case where the heat conductivity of the plate-like fillers is larger than that of the rigid polyurethane foam, there is little influence of heat conduction through the plate-like substance in the direction of the thickness, because not only particles of the plate-like filler so arranged as not to contact with each other continuously in the heat insulating direction but also the layer of the plate-like filler is very thin.

Furthermore, since flake-like small particles, which are not in a transversely continuous form, are used as the plate-like filler, heat does not spread easily in the planar direction.

Further, since compression molding is performed under pressure at a temperature not lower than the glass transition point, the pulverized rigid polyurethane foam is squashed so that the apparent cell size in the direction of the thickness, that is, in the heat insulating direction becomes smaller than the original cell size of the pulverized rigid polyurethane foam. Accordingly, an effect of improving radiation heat insulation can be achieved.

Accordingly, in addition to the fact that increase of heat conduction in a solid is negligible compared with the conventional case where only rigid polyurethane foam is used as the core material, lowering of heat radiation surpasses the increase of the heat conduction. Accordingly, improvement in heat insulating property of the vacuum heat-insulating panel can be achieved.

Further, since the core material which is a complex having the plate-like filler arranged on the rigid polyurethane foam is compressed in advance by pressure larger than the atmospheric pressure applied to the core material in a vacuum, and solidified by an adhesive agent, the core material in the vacuum heat-insulating panel is never deformed by the atmospheric pressure applied when the inside of the packaging material is evacuated into a vacuum.

Improvement of heat insulating property will be confirmed below by use of specific examples of the present invention. Table 1 shows the composition of the core material used in the vacuum heat-insulating panel in Inventive Examples 1 to 4 according to the present invention.

[Table 1]

In order to prepare the core material, rigid polyurethane foam was pulverized into particles at 135° C. in a vacuum so that both discharge of blowing gas from cells and communication of cells with one another were performed, and the pulverized particles were subsequently filtered through a sieve or the like so that the pulverized particles in a preferred size range were selected.

Semicured fine powder of epoxy resin exhibiting low melting viscosity in only resin containing no solvent was used as an adhesive agent. After being put into a rotary-blade type mixer vessel, the adhesive agent, the pulverized rigid polyurethane foam and flake-like mica used as a plate-like filler were mixed sufficiently. A necessary amount of the uniformly mixed mixture was put into a mold and fine vibration was given thereto so that the plate-like filler heavy in specific gravity was deposited at the bottom surface of the mold so as to be oriented in the planar direction. Then, compression molding was performed for 30 minutes at 130° C. under a compression pressure of 1.2 kg/cm$^2$.

Three sheets of thus obtained material were stuck to one another to form a core material having a thickness of 20 mm.

As comparative examples, there were used a conventional vacuum heat-insulating panel in which rigid urethane foam having open cells communicated with one another was used as a core material as represented by JP-A-60-205164, and a conventional vacuum heat-insulating panel in which two rigid polyurethane foam layers and aluminum foil excellent in radiation heat shielding effect disposed between the layers were used as a core material as represented by JP-A-62-13979.

In Comparative Example 1, communicated open-cell rigid urethane foam having a density of 45 kg/m³ and a cell size of 300 μm was used. In Comparative Example 2, the same open-cell rigid polyurethane foam as that in Comparative Example 1 was sliced into two sheets at its center portion and aluminum foil having a thickness of 10 μm was put between the two sheets of the rigid polyurethane foam.

The core material was used after it was prepared to have a thickness of 20 mm and a surface size of 180×180 mm and dried at 120° C. for about one hour. After the core material was inserted into a packaging material made of a plastic multi-layer sheet dried at 110° C. for 30 minutes, the packaging material was heat-sealed in a vacuum atmosphere of $10^{-2}$ Torr to thereby obtain a vacuum heat-insulating panel as a sample.

Figure 5:
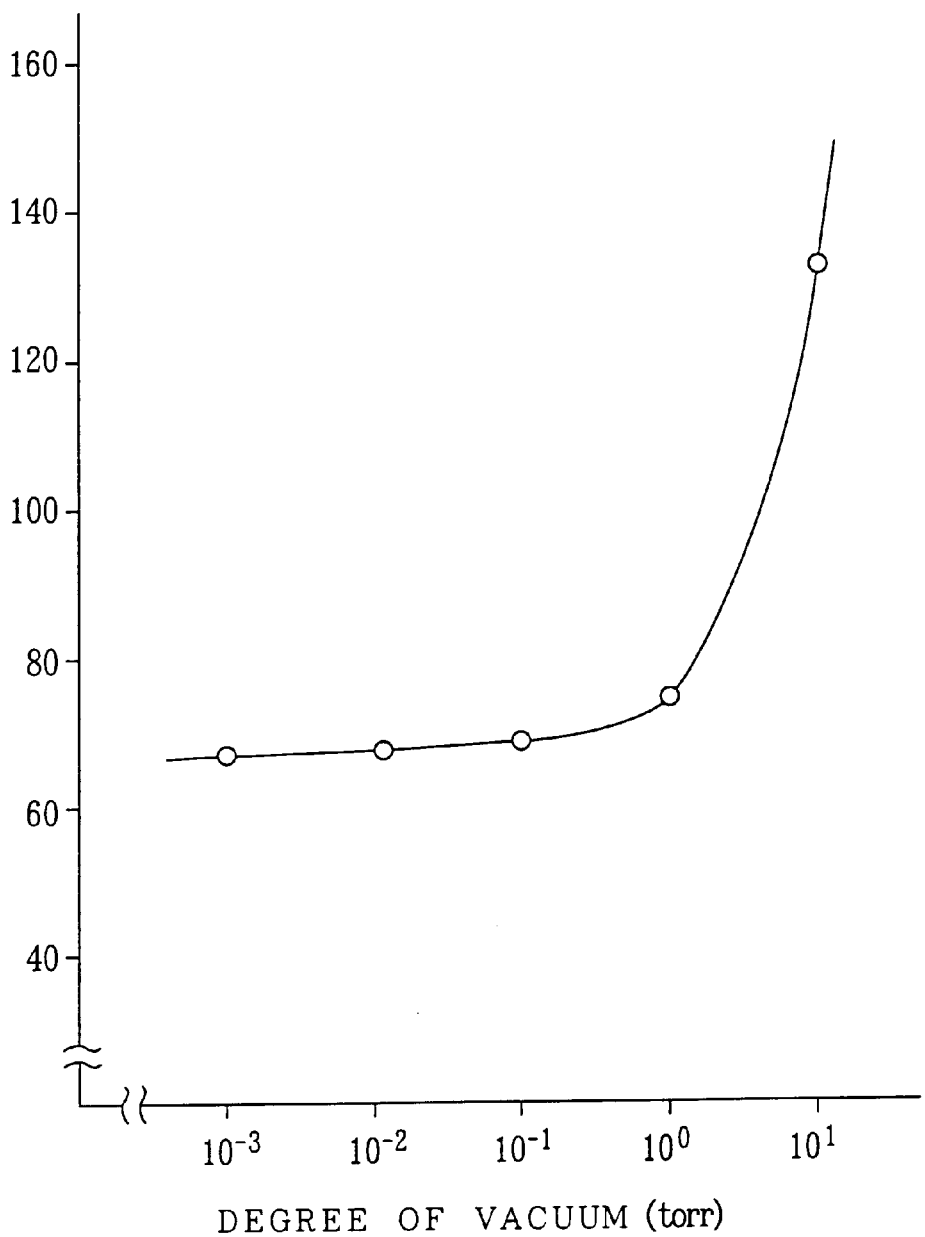
FIG. 5 is a graph showing the relation between the degree of vacuum and heat transfer rate of the vacuum heat-insulating panel.

Further, a similar sample of the vacuum heat-insulating panel in which the atmosphere for heat sealing was adjusted to an arbitrary degree of vacuum in a range from $10^{-1}$ to $10^{-3}$ Torr was prepared for each of Inventive Examples 1 and 2 and Comparative Examples 1 and 2. The resultant dependency of the heat insulating property of the samples on the vacuum degree was evaluated. FIG. 5 shows the result concerning Comparative Example 1. Inventive Examples 1 and 2 and Comparative Example 2 exhibit substantially the same tendency. As seen in FIG. 5, the heat insulating property varies depending on the degree of vacuum. The heat insulating property corresponding to $10^{-2}$ Torr around which the heat insulating property becomes stable is employed for evaluation.

Table 2 shows the results of evaluation of heat insulating property, its change with the passage of time and the change of the shape with the passage of time, of vacuum heat-insulating panels in which the degree of vacuum was adjusted to a value equivalent to $10^{-2}$ Torr.

[Table 2]

Evaluation of heat insulating property was made on the basis of heat transfer rate consisting of heat conduction and heat radiation, and "AUTO-LAMBDA" made by EIKO-SEIKI Co., Ltd. was used for measurement of heat transfer rate. The change of heat insulating property with the passage of time was evaluated by the quantity of the change between the heat transfer rate measured after a sample of the vacuum heat-insulating panel was left in an atmosphere of 50° C. for an arbitrary time, and the heat transfer rate of the sample measured just after the sample was produced.

The change of the shape with the passage of time was evaluated on the basis of the change of the thickness in the aforementioned sample. Furthermore, with respect to the deformation of a side surface of the sample, by which contraction could be particularly easily judged, visual observation was made on the vacuum heat-insulating panel after 30 days.

Incidentally, the drying condition of the core material in Comparative Examples was set to be 120° C.×1 hour in order to prevent deformation.

As is obvious from Table 2, in the heat insulating property of each vacuum heat-insulating panel according to the present invention using a core material provided with a layer containing mica oriented in the planar direction, reduction of heat transfer rate by about 0.0015 Kcal/mhK or more could be achieved in comparison with the case where a conventional communicated open-cell rigid urethane foam was used as a core material. The vacuum heat-insulating panel according to the present invention using rigid polyurethane foam having small cell size was particularly effective.

Further, also as to the change of the heat transfer rate and the size with the passage of time, the vacuum heat-insulating panels according to the present invention were smaller than the conventional vacuum heat-insulating panels using communicated open-cell rigid polyurethane foam as a core material.

Next, influence of the pulverizing condition of the rigid polyurethane foam and the particle size of the pulverized rigid polyurethane foam in the vacuum heat-insulating panel according to the present invention were confirmed. Core materials were produced in the same manner as in Inventive Examples 1 to 4 except that flake-like mica as a filler was mixed in each pulverized rigid polyurethane foam made under different pulverizing conditions from rigid polyurethane foam having been used as a heat insulating material in a refrigerator. A vacuum heat-insulating panel comprising each core material enclosed in a packaging material in a vacuum atmosphere equivalent to $10^{-2}$ Torr was used as a sample for evaluating the heat insulating property thereof. The mean cell size of the rigid polyurethane foam used was 150 μm and the mean diameter of the mica flakes used was 2.5 mm.

The "glass transition point", which is a temperature at which resin of rigid polyurethane foam used as the heat insulating material in the refrigerator is softened rapidly, was 96° C., considering the inflexion point obtained from the temperature dependency of the volume expansion coefficient. The heating condition at the time of pulverization was selected to be 135° C. which was sufficiently higher than the glass transition point. As shown in Table 3, the pulverizing conditions are a heating atmosphere of 135° C. in a vacuum for Inventive Examples 3, 5 and 6 and Comparative Example 9, an atmosphere at normal temperature under normal pressure for Comparative Examples 3 and 4, an atmosphere at normal temperature in a vacuum for Comparative Examples 5 and 6 and a heating atmosphere of 135° C. under normal pressure for Comparative Examples 7 and 8.

Incidentally, in Table 3, the symbol ○ shows the case where pulverization was carried out in the atmosphere shown in the table, and the symbol x shows the case where pulverization was not carried out in the atmosphere shown in the table but in the atmosphere under normal pressure or at normal temperature.

Further, as shown in Table 4, the pulverized particles are filtered through a sieve to select a size to be in a range from 150 μm which is equal to the cell size to 700 μm which is about five times as large as the cell size.

[Table 3]
[Table 4]

Table 5 shows heat insulating property (heat transfer rate) of vacuum heat-insulating panels using core materials comprising different pulverized rigid polyurethane foam obtained under the aforementioned respective pulverizing conditions, and further shows the change of the heat insulating property with the passage of time.

[Table 5]

In Table 5, the effect of suppressing the change of heat transfer rate with the passage of time by the pulverization at hot temperature (Comparative Examples 7 and 8) and in vacuum atmosphere (Comparative Examples 5 and 6) is recognized in comparison with that by the pulverization at normal temperature under normal pressure (Comparative Examples 3 and 4) but the change is rather a large value to bring hindrance in practical use, that is, the suppressing effect is insufficient. On the other hand, the vacuum heat-insulating panels of Examples 3, 5 and 6 using pulverized particles having the particle size in the range from 150 to 400 μm, pulverized under both the conditions of vacuum and heating according to the present invention exhibits very small deterioration in heat insulating property, that is the change of heat transfer rate was in a range from 0.0001 to 0.0002 Kcal/mhK under an accelerated deterioration atmosphere of 50° C. When pulverized particles having a large size about five times as large as the cell diameter were used like in Comparative Example 9, not only the vacuum heat-insulating panel was inferior in heat insulating property but also the increase of heat transfer rate with the passage of time was 0.0005 Kcal/mhK in spite of pulverization performed under the conditions of vacuum and heating. That is, this result suggested the possibility of hindrance in practical use.

Accordingly, the size of pulverized particles is preferably in a range from a size equal to the cell size to a size three times as large as the cell size.

Next, description will be made upon the effect of a multi-layer structure obtained by a process in which fine vibration is given to a mixture of pulverized rigid polyurethane foam and flake-like mica as a filler so that the pulverized rigid polyurethane foam is separated from the filler and the filler is oriented in the planar direction. A core material was produced from the same composition as in Inventive Example 3 in such a manner that impulsive fine vibration was given to a 1:1 weight-proportion mixture of the pulverized rigid polyurethane foam and the flake-like mica to make the mica deposited to form the lower layer for producing a complex structure. The core material was enclosed in a packaging material in an arbitrary vacuum atmosphere to thereby produce a vacuum heat-insulating panel as a sample. The heat insulating property of the sample was evaluated. The mean cell size of the rigid polyurethane foam used was 150 $\mu$m. The rigid polyurethane foam pulverized under heating of 135° C. in a vacuum was used. Mica flakes having a mean diameter of 2.5 mm were used.

Using core materials of the same thickness obtained by lamination of a plurality of the complex structures in Inventive Examples 7 through 9 and a core material of the same thickness in Comparative Example 10, molded in the form of a simple mixture without giving any fine vibration, vacuum heat-insulating panels were produced and the heat insulating property (heat transfer rate) of the panels and the change of the heat insulating property with the passage of time were measured. Table 6 shows the results.

[Table 6]

As is obvious from the results of Table 6, it can be confirmed that the heat transfer rate of Inventive Examples 7 through 9 according to the present invention in which fine vibration was given to the flake-like mica to orient it in the planar direction was improved by about 0.0020 Kcal/mhK compared with Comparative Example 10 in which the flake-like mica was mixed simply.

Next, the description will be made upon the contraction behavior of the vacuum heat-insulating panel influenced by the compression molding condition of the complex structure of pulverized rigid polyurethane foam and flake-like mica, that is, the stability of the thickness of the vacuum heat-insulating panel left in air.

Samples (core materials) different in loading pressure in compression molding of the complex structure were produced. Each of the samples was enclosed in a packaging material in a vacuum of $10^{-2}$ Torr to obtain a vacuum heat-insulating panel having a thickness of 20 mm ($\pm 0.5$ mm). The vacuum heat-insulating panel was left in an autoclave under a pressure of 0.3 kg/cm$^2$ in a heated atmosphere of 50° C., and the change of the size was examined.

The rigid polyurethane foam used here was a material having a mean cell size of 150 $\mu$m, and pulverized under heating of 135° C. in a vacuum.

The core materials were produced with the same composition as in Inventive Example 3, using mica flakes having a mean diameter of 2.5 mm.

Table 7 shows the size change and heat insulating property (heat transfer rate) of vacuum heat-insulating panels, in comparison between the laminated core materials in Inventive Examples 3 and 10 to 12, as well as Comparative Examples, formed from five complex structures and obtained with different loading pressure in compression molding.

[Table 7]

As is obvious from Table 7, in the case of Comparative Example 11 in which loading pressure at the time of compression molding is small, the contraction of the vacuum heat-insulating panel is large so that the large contraction is considered to affect external appearance design if the panel is applied to a refrigerator or the like. On the contrary, in the vacuum heat-insulating panels using core materials compression-molded by loading pressure not smaller than the atmospheric pressure, the size change is very small. However, if a core material compression-molded with too high loading pressure is used, the original heat insulating property cannot be brought into full play and tends to get worse as shown in Comparative Example 12. Accordingly, the pressure at the time of compression molding is preferable to be in a range from 0.7 to 2.0 kg/cm$^2$, particularly preferably in a range from 1.4 to 2.0 kg/cm$^2$. It is further confirmed that heat insulating property is improved if the compression pressure at the time of compression molding is increased. Taking into account reduction in weight of the vacuum heat-insulating panel, the pressure between 2.0 kg/cm$^2$ in Inventive Example 12 and 1.4 kg/cm$^2$ in Inventive Example 11 having similar performance to Inventive Example 12 is considered to be more effective.

EMBODIMENT 2

Next, running performance of a refrigerator using a vacuum heat-insulating material according to the present invention was measured and the effect of the same was confirmed.

Here, a vacuum heat-insulating panel produced in the same manner as in Embodiment 1 by using a packaging material having an 8 $\mu$m-thick intermediate layer of aluminum foil was used.

Figure 8:
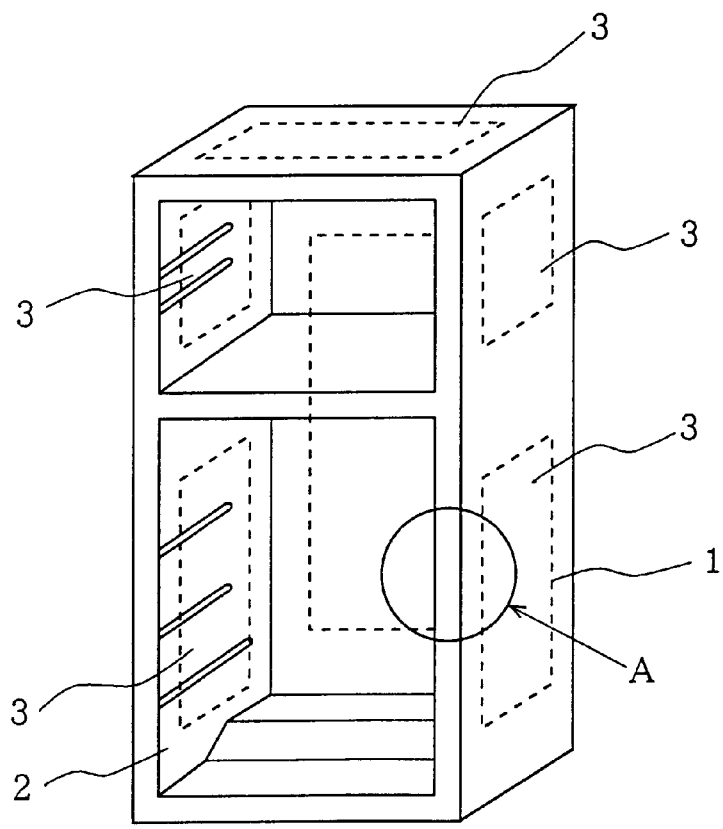
FIG. 8 is a perspective view of the refrigerator showing the disposition of vacuum heat-insulating panels according to the present invention.
Figure 9:
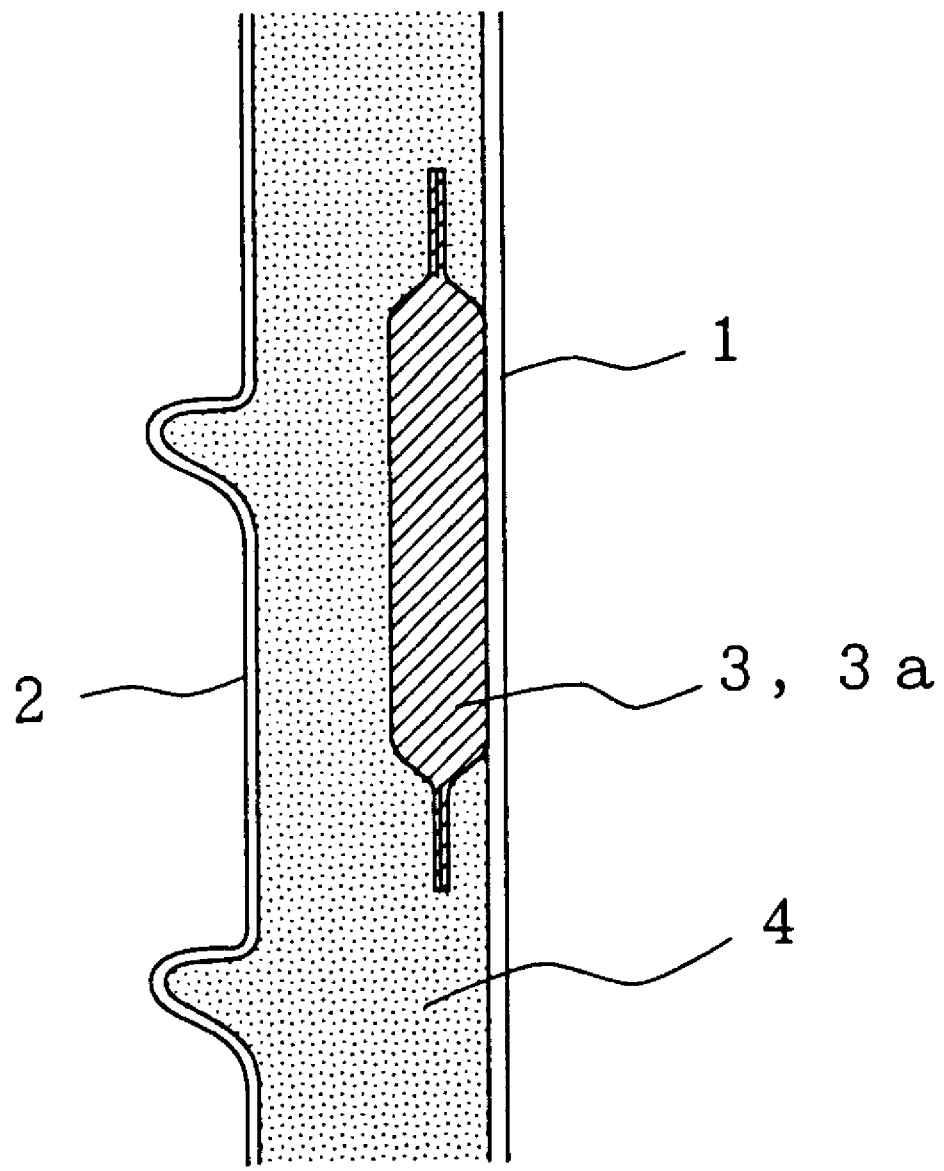
FIG. 9 is a conceptual view showing a section of a heat insulating wall of the refrigerator shown in FIG. 8.
Figure 10:
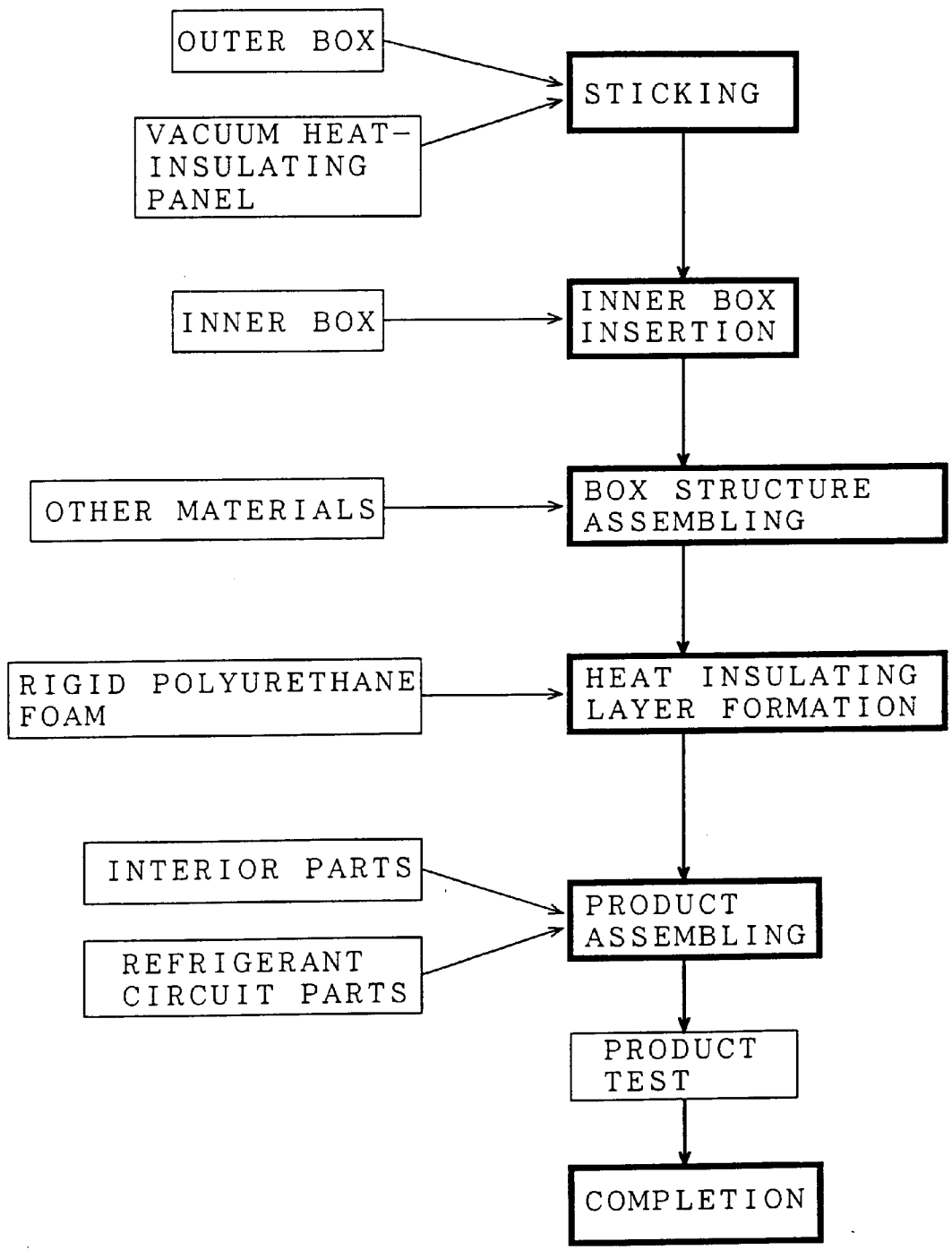
FIG. 10 is a flow chart showing a process for producing a refrigerator having vacuum heat-insulating panels mounted thereon.
Figure 11:
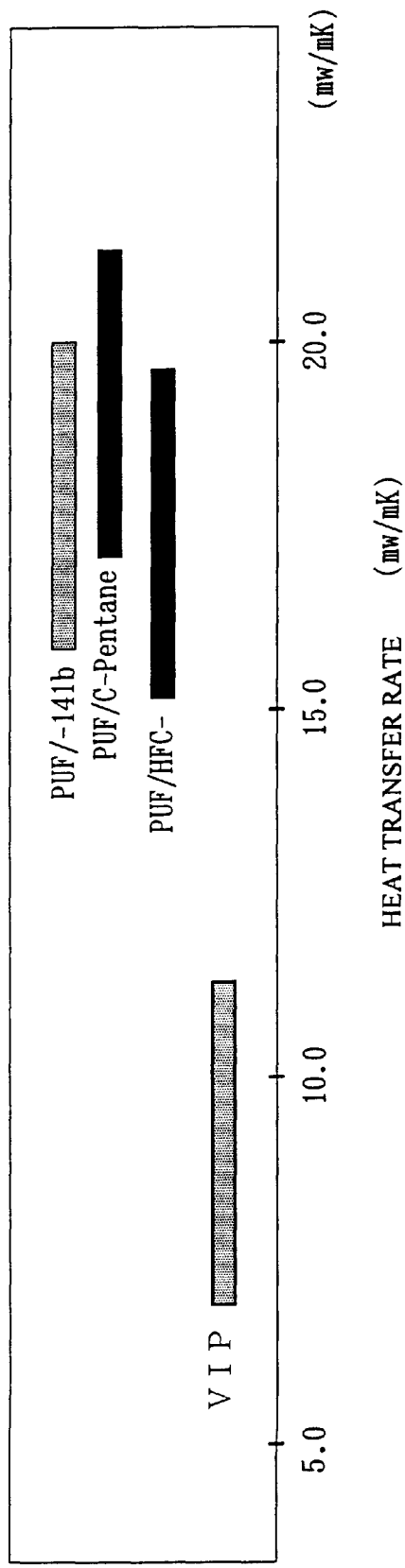
FIG. 11 is a comparison chart of performance among various heat insulating materials.

First, in gaps formed by fitting an inner box 2 vacuum-molded from an ABS resin into an outer box 1 obtained by bending of a thin steel plate, vacuum heat-insulating panels 3 were stuck to the outer box side as shown in FIGS. 8 and 9 to thereby form a heat insulating box of a refrigerator. Further, rigid polyurethane foam 4 was injected into residual gaps and foamed so that the residual gaps were filled with the rigid urethane foam 4 to thereby fix the vacuum heat-insulating panels.

By using the heat insulating box, a refrigerant circuit, etc. were disposed and a 400 L class (400 liters inner volume) refrigerator was assembled as Inventive Example 13.

On the other hand, a refrigerator using a heat insulating box produced in the same manner as described above by using vacuum heat-insulating panels containing a core material formed from communicated open-cell rigid urethane foam was assembled as Comparative Example 13 and a refrigerator using a heat insulating box in which all gaps between an inner box and an outer box were filled only with rigid polyurethane foam was assembled as Comparative Example 14. Electric energy consumption by each of the refrigerators was measured in accordance with B method of electric energy consumption test of JIS-C9607, and the result is shown in Table 8.
[Table 8]

As is obvious from the results in Table 8, Inventive Example 13 which is a refrigerator using vacuum heat-insulating panels according to the present invention is able to be operated at the same cooling temperature with less consumed electric energy in comparison with Comparative Example 14 which is a refrigerator comprising a conventional box using only rigid polyurethane foam as a heat-insulating material. Accordingly, it can be said that Inventive Example 13 is superior in heat insulating property to Comparative Example 14. Further, the electric energy consumed by the refrigerator of Inventive Example 13 is smaller than the refrigerator of Comparative Example 4 using a vacuum heat-insulating panel employing a core material of communicated open-cell rigid urethane foam according to the conventional specification. Accordingly, it is proved that excellent heat insulating property can be secured in Inventive Example 13.

Although the above description has been made upon the case where a refrigerant circuit, etc. are disposed after vacuum heat-insulating panels are attached to the outer box, the present invention may be also applied to the case where vacuum heat-insulating panels are shaped correspondingly to the shape of the inner box and stuck to the inner box portion, and then residual gaps are filled with rigid polyurethane foam. Further, the vacuum heat-insulating panels may be shaped correspondingly to the shape of a condenser pipe of a refrigerant circuit disposed in the inner surface of the outer box which is a molded product by bending of a thin steel plate, the thus shaped vacuum heat-insulating panels are stuck to the outer box portion in the gap between the inner box and the outer box, and the residual gaps may be filled with rigid polyurethane foam.

The aforementioned application of the vacuum heat-insulating panel according to the present invention is not limited to the refrigerator as Inventive Examples shown here. For example, the vacuum heat-insulating panel may be applied as heat insulating parts of heat and cold reserving products such as an on-vehicle small-sized refrigerator, a prefabrication type simplified refrigerator, a cold reserving car, a heat reserving material for a pipe and a building, etc. Various changes or modifications may be made without departing from the gist of the present invention.

EMBODIMENT 3

In a further embodiment of the present invention, pulverized rigid polyurethane foam with a specific particle size obtained by a pulverizing operation in a separating step of a disposal processing of a refrigerator or the like and pulverized particles or powder of inner box material in a refrigerator or the like are mixed, or they are pulverized and mixed with each other by an extrusion kneader or the like.

Further, after a board-like molded product obtained by compression molding of these materials in a high-temperature vacuum atmosphere is inserted as a core material into a packaging material. Then, the insertion openings of the package are heat-sealed under a vacuum state to thereby obtain a vacuum heat-insulating panel.

Incidentally, the pulverized rigid polyurethane foam may be replaced by powder of other plastic foam processed into the same shape.

According to this method, inner box material of styrene resin such as polystyrene, ABS resin or the like used in a refrigerator and rigid polyurethane foam used as a heat insulating material in the refrigerator can be collected from classified refuse at the time of disposal of a refrigerator, so that their pulverized particles can be used as materials. Furthermore, since the pulverizing operation of rigid polyurethane foam in the classified collection step is performed with the destruction of cell membranes, communication of cells can be achieved easily. Accordingly, an open-cell structure suitable for vacuum heat insulation can be obtained.

When the pulverized mixture is put into a mold and compression-molded at a temperature not lower than the melting point of the inner box material, pulverized particles of rigid polyurethane foam can be welded to each other by the melted pulverized particles of the inner box material so as to be bonded and solidified. If loading pressure larger than the atmospheric pressure is applied as molding pressure in this occasion, an arbitrary shape can be secured with no deformation even when the inside of the packaging material will be kept in a vacuum.

Further, as another method, pulverizing of rigid polyurethane foam, mixing with the inner box material and welding may be performed simultaneously by an extrusion kneader. In this case, a pellet-like mixture of a solid-state material is also obtained. According to this method, compression molding can be performed more easily.

Figure 6:
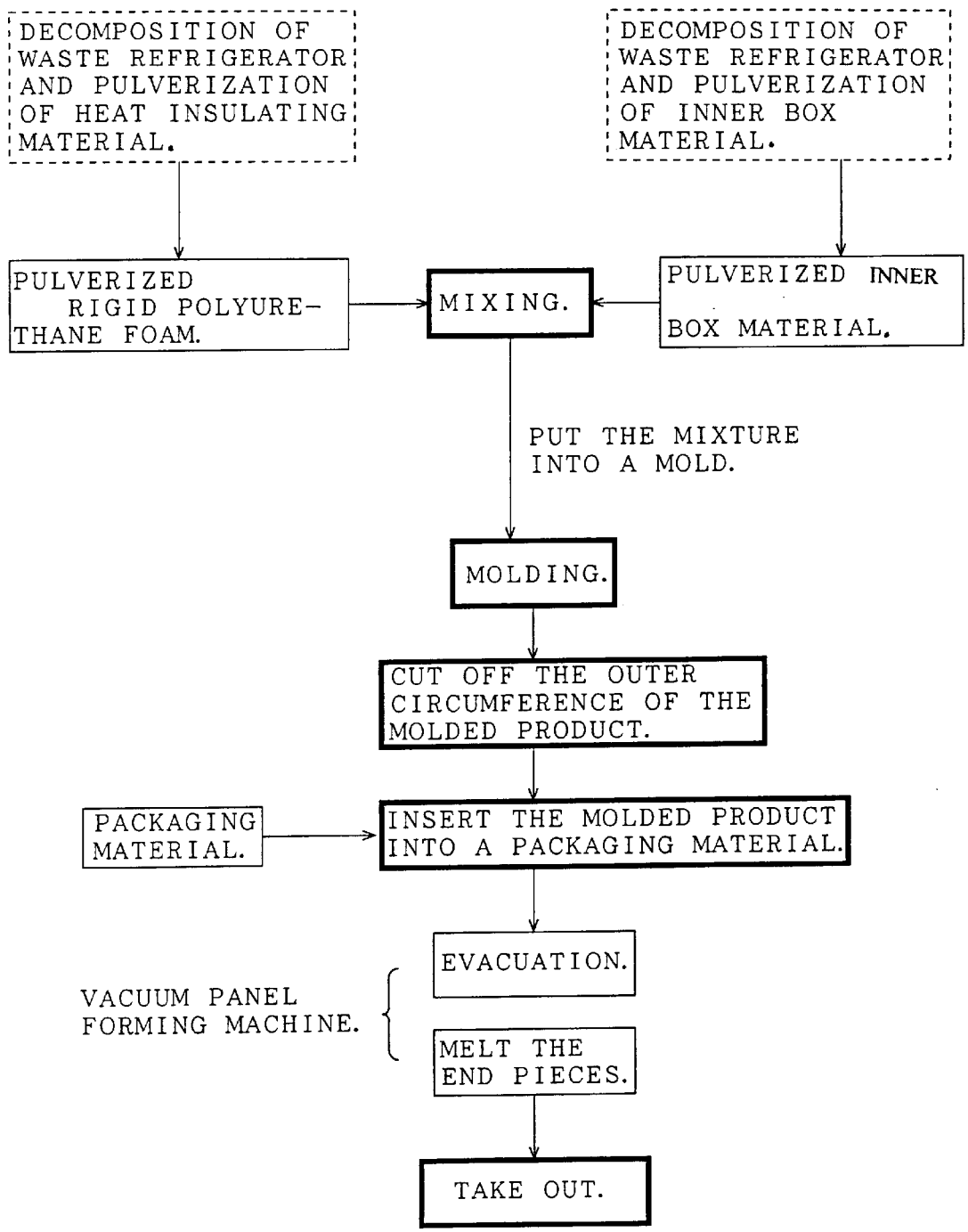
FIG. 6 is a flow chart showing a process for producing another vacuum heat-insulating panel according to the present invention.

FIG. 6 is a flow chart showing a process for producing a vacuum heat-insulating panel in Embodiment 3 of the present invention. As shown in FIG. 6, both the pulverized rigid polyurethane foam obtained by disassembling a scrapped refrigerator and pulverizing a heat insulating material and the pulverized inner box material obtained by disassembling the scrapped refrigerator and pulverizing an inner box material are mixed. The resulting mixture is put into a mold and molded. Then, the outer circumference of the molded product is cut off. The resulting molded product is inserted into a packaging material which is then evacuated and welded onto an end-piece by a vacuum panel forming machine. Thus, a vacuum heat-insulating panel is taken out from the machine. The process of producing such a vacuum heat-insulating panel will be described below in detail in separate paragraphs of Production of Core Material, and Production of Vacuum Heat-Insulating Panel using the Core Material.

(1) Production of Core Material
(a) Production of Pulverized Mixture (Powder-like)

From a refrigerator scrapped and disassembled, an inner box constituting a refrigerator box structure and rigid polyurethane foam which is a heat insulating material are peeled off and pulverized separately by a pulverizer having a rotary-blade type cutter.

Pulverized particles of rigid polyurethane foam are filtered through a sieve to select particles having a size in a range from 100 $\mu$m to 1000 $\mu$m equivalent to the cell size of foam to the size equivalent to five times as large as the cell size, preferably in a range from 300 $\mu$m to 600 $\mu$m equivalent to the size twice or three times as large as the cell size.

The inner box material is preferably pulverized into fine powder so as to be electrostatically deposited on the outer circumference of pulverized rigid polyurethane foam. That is, pulverized particles of the inner box material having a size not larger than 50 $\mu$m, preferably not larger than 20 $\mu$m are filtered so as to be used as the pulverized inner box material. To aggregate the pulverized rigid polyurethane foam, the content of the pulverized inner box material need to be not smaller than 10% by weight. To make a sufficient volume of gaps remain in the compression-molded product, the content of the pulverized inner box material is preferably selected to be as small in weight proportion as possible in a range not larger than 50% by weight so long as solidification can be achieved.

The two kinds of pulverized particles are preferably mixed by a rotary-blade type mixer. In this case, particles rub each other and are electrified, so that a preferable state in which small inner box particles are deposited on the outer circumference of pulverized rigid polyurethane foam can be secured. As another mixing means, a drum type mixer may be used.

(b) Production of Pulverized Mixture (Pellet-like)

Rigid polyurethane foam as a heat insulating material and an inner box as an inner box material are peeled off from a disassembled refrigerator, cut into a size capable of being put into an extrusion kneader, and then put into the extrusion kneader. The extrusion kneader has a screw with a pitch which is large in the vicinity of an inlet but decreases gradually as the position approaches an outlet. Flow of pulverized particles caused by extrusion according to the rotation of the screw makes sufficient kneading on the basis of increase of shearing force caused by the reduction of the pitch and partial inverted rotation, and the inner box material is melted by frictional heat generated at that time. Accordingly, the rigid polyurethane foam is not pulverized excessively, and the resin is discharged as a pellet-like mixture having a size not larger than 5 mm.

The inner box material is melted in the process in which the inner box material and rigid polyurethane foam are pulverized simultaneously. The inner box material, however, little enters into cells of the rigid polyurethane foam and little reduces the gap. Accordingly, since the inner box material is suitably deposited on the outer circumference of the pulverized rigid polyurethane foam, communication of cells required for the core material in the vacuum heat-insulating panel is not spoiled. On the other hand, if the inner box material and rigid polyurethane foam are perfectly melted and mixed and discharged continuously, the discharged mixture is not preferable because of a state in which the cells are covered with the inner box material.

In the pellet-like mixture, it is necessary that the preferred proportion of the inner box material to the rigid polyurethane foam is selected to be not smaller than 10% by weight for the purpose of aggregating rigid polyurethane foam powder. Further, for the purpose of securing sufficient pores, the content of the inner box material is selected to be preferably not larger than 50% by weight, particularly preferably not larger than 30% by weight.

To obtain a core material, any one of the aforementioned pulverized mixtures is put into a mold for molding a flat plate so as to have uniform thickness without extreme difference. After the mold is heated to a temperature not lower than the melting point of the inner box material, the mixture is compression-molded while the inside of the mold is kept in a vacuum state in a range from about $10^{-1}$ to $10^0$ Torr. The most important matter in this process is compression pressure, which is selected to be preferably in a range from 0.1 to 1.2 kg/cm$^2$, particularly preferably in a range from 0.2 to 0.5 kg/cm$^2$, inclusive of the weight of the mold.

(2) Production of Vacuum Heat-Insulating Panel

After a core material is inserted into a packaging material which is heat-sealed on three edge sides in advance, the packaging material is put into a vacuum panel molding machine 9 shown in FIG. 4 and heat-sealed on the remaining one edge side while an atmosphere of a predetermined degree of vacuum is secured. Thus, a vacuum heat-insulating panel is produced.

Figure 7:
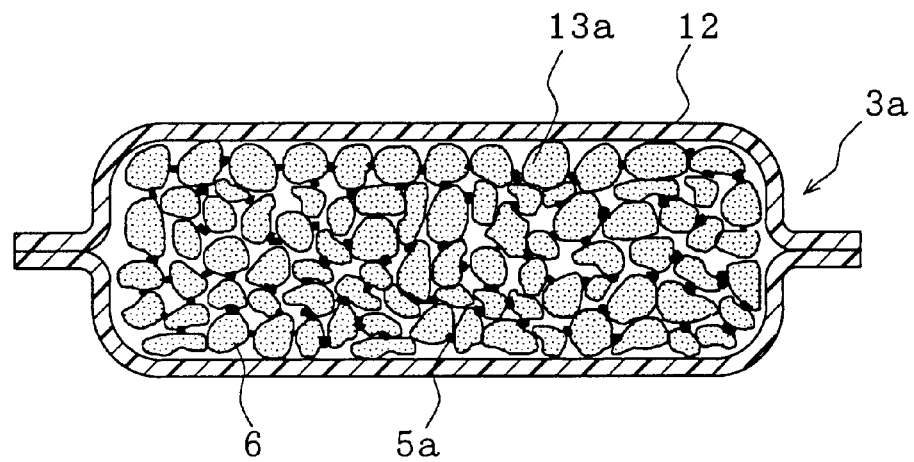
FIG. 7 is a sectional view of the vacuum heat-insulating panel produced by the process shown in FIG. 6.

That is, after a packaging material 12 in which a core material 13 is inserted is put between upper and lower melting heaters 10, the degree of vacuum in the inside of the vacuum panel molding machine 9 is adjusted to a predetermined value by a vacuum adjusting valve 11. Then, the insertion opening is fixed by sealing pressure apparatuses 8. After heat-sealing, the heaters are turned off. After cooling, the vacuum is released and the packaging material 12 is taken out of the machine to thereby obtain a vacuum heat-insulating panel. FIG. 7 is a sectional view showing the structure of the thus obtained vacuum heat-insulating panel 3a according to the present invention. Further, the panel 3a contains pulverized rigid polyurethane foam 6 and pulverized thermoplastic resin 5a such as ABS.

Here, the packaging material 12 is constituted by a multi-layer sheet having a sealing surface formed by thermoplastic resin capable of being thermally bonded for welding, an intermediate layer formed from metal foil such as aluminum foil or the like for entirely blocking the penetration of outside air, and an outermost layer formed from a resin having durability against scratching, etc. In this manner, not a single film but a multi-layer sheet composed of three or more layers is used as the packaging material 12.

Using the vacuum heat-insulating panels produced in such a manner as described above, characteristics including heat insulating property and change of the shape with the passage of time were confirmed. In each of the vacuum heat-insulating panels (Inventive Examples 21 to 24 and Comparative Example 21) used as samples, the thickness of the core material was 20 mm and the size of the surface was 180×180 mm. A five-layer sheet composed of nylon, aluminum foil, and polyethylene layers in the order successively from the outer surface and further composed of interposition layers of an adhesive agent on the upper and lower surfaces of the aluminum foil was used as the packaging material. Further, the degree of vacuum was selected to be $10^{-2}$ Torr. Heat insulating property was evaluated by heat transfer rate, and "AUTO-LAMBDA" made by EIKO-SEIKI Co., Ltd. was used for measurement of the heat transfer rate.

The effect of improving heat insulating property will be described below. Table 9 shows the compositions of the respective samples.

[Table 9]

A powder mixture of the pulverized rigid polyurethane foam and the pulverized inner box (ABS resin) in accordance with the mixture proportion shown in Table 9 was put into a mold for molding a flat plate with a size of 180×180 mm and heated at 260° C. for 15 minutes. The mixture was subsequently left for 10 minutes under the condition of the degree of vacuum kept in a value of $10^{-1}$ Torr to be cooled nearly to the room temperature, and then it was taken out. The loading pressure imposed on the powder mixture in this occasion was selected to be 0.3 kg/cm$^2$ inclusive of the weight of the mold.

The core material thus obtained was inserted into a packaging material and the insertion opening was welded in an atmosphere of the degree of vacuum of $10^{-2}$ Torr to thereby produce a vacuum heat-insulating panel. After the vacuum heat-insulating panel was aged in an atmosphere of 50° C. for 7 days, the heat transfer rate was measured. The result is shown in Table 10. On the other hand, deformation caused by the atmospheric pressure was visually confirmed. Further, the evaluation results of conventional vacuum heat-insulating panels using glass mat and communicated open-cell rigid polyurethane foam as core materials are shown as Comparative Examples 22 and 23. In the Examples, the communicated open-cell rigid polyurethane foam in Comparative Example 23 had a mean cell size of 200 μm and had a structure in which holes were formed in membranes forming cells so that air remaining in the inside of the cells could be easily discharged through the holes.

[Table 10]

As shown in Table 10, the vacuum heat-insulating panels in Inventive Examples 21 to 24 are improved in heat insulating property expressed by heat transfer rate, in comparison with the vacuum heat-insulating panels using glass mat in Comparative Example 22 and communicated open-cell rigid urethane foam in Comparative Example 23. The heat insulating property in Inventive Examples 21 to 24 is not inferior to the Comparative Examples even though the vacuum heat-insulating panels are recycled products.

Further, in Comparative Example 21 in which the particle size of pulverized rigid polyurethane foam exceeds three times as large as the cell size, the heat insulating property is deteriorated greatly. It is considered that this is because destruction of cell membranes was not conducted sufficiently in spite of evacuation performed at the time of compression molding, so that gas remaining in independent cells was discharged gradually into a system of the vacuum panel and the degree of vacuum was lowered to make the heat transfer rate worsened.

Although the cell size of the rigid polyurethane foam used in Inventive Examples 21 to 24 was substantially equal to that in Comparative Example 23, the heat transfer rate of Inventive Examples 21 to 24 was lower than that of Comparative Example 23. It is considered that this is because cells were squashed in the direction of the thickness, that is, in the heat insulating direction by compression molding to reduce the apparent cell size to thereby improve radiation heat insulating effect.

Next, application of a core material produced from a pellet-like mixture to a vacuum heat-insulating panel will be described below. Rigid polyurethane foam and inner box material were cut into pieces of a size not larger than 50 mm, put into an extruder, kneaded without heating, and then extruded. Table 11 shows the mixture proportion of the rigid polyurethane foam and the inner box material mixed in this case. On this occasion, Comparative Example 24 shows the case where the mixing ratio of the inner box material was selected to be 8% which was lower than the recommended value, and Comparative Example 25 shows the case where the mixing ratio of the inner box material was selected to be 70% as an excessive value on the contrary.

[Table 11]

A pellet-like mixture obtained by kneading rigid polyurethane foam and inner box material in accordance with the proportion shown in Table 11 was put into a mold for molding a flat plate of a size of 180×180 mm to produce a core material. After the mixture was heated at 260° C. for 15 minutes, the mixture was cooled nearly to the room temperature and then taken out. On this occasion, the loading pressure imposed on the pellet-like mixture was selected to be 0.3 kg/cm inclusive of the weight of the mold.

Using the core material thus obtained, a vacuum heat-insulating panel was produced under the condition in which the degree of vacuum at the time of sealing the packaging material was $10^{-2}$ Torr. The heat transfer ratio was measured after the vacuum heat-insulating panel was aged in an atmosphere of 50° C. for 7 days, and the result is shown in Table 12. Incidentally, deformation caused by the atmospheric pressure was confirmed visually.

[Table 12]

In the case of the vacuum-insulating panel of Comparative Example 24 in which the mixture proportion of the inner box material was small, rigid polyurethane foam particles were not aggregated sufficiently and kept in a powder state even though the inner box material was melted. As a result, a board-like sample by compression molding could not be obtained. Further, it was confirmed in Comparative Example 25 that increase of the heat transfer rate was caused for the reason that the surface of the pulverized rigid polyurethane was covered with the molten inner box material at the time of destruction of rigid polyurethane foam so that sufficient communication of cells could not be achieved.

On the other hand, the heat transfer rate of the vacuum heat-insulating panels in Inventive Examples 25 to 27 using core materials according to the present invention showed more excellent heat insulating property than that of the vacuum heat-insulating panels in Comparative Examples 22 and 23 as shown in Table 10, so that it was confirmed that the vacuum heat-insulating panels in Inventive Examples 25 to 27 were not inferior in heat insulating property even though they were recycled products.

The effect of the loading pressure imposed at the time of compression molding, which is equivalent to the atmospheric pressure, was examined. A pellet-like mixture produced by an extruder was put into a mold for molding a flat plate of a size of 180×180 mm. After the mixture was heated at 260° C. for 15 minutes, it was cooled nearly to the room temperature to thereby obtain a core material. Each of the core materials finished by changing the loading pressure imposed on the pellet-like mixture at the time of compression-molding was evaluated for adaptability to the vacuum heat-insulating panel. Incidentally, the cell size of rigid polyurethane foam used for the mixing with the inner box material was 100 μm. The mixture ratio in this case is shown in Table 13.

[Table 13]

Vacuum heat-insulating panels using core materials, with the mixture ratio shown in Table 13, molded under such a condition that the molding pressure inclusive of the weight of the mold at the time of compression molding was in a range from 0.1 to 1.2 kg/cm² were designated as Inventive Examples 28 to 33, and vacuum heat-insulating panels using core materials, with the mixture ratio shown in Table 13, molded under such a condition that the molding pressure was out of the above range were designated as Comparative Examples 26 to 29. They were used for evaluation.

Vacuum heat-insulating panels in which the inside of the packaging material was kept in the degree of vacuum of $10^{-2}$ Torr were produced. After the vacuum heat-insulating panels were aged in an atmosphere of 50° C. for 7 days, their heat transfer rate and external appearance deformation were measured. The results of measurement are shown in Table 14.

[Table 14]

As shown in Table 14, it was confirmed that, when the pressure imposed on a core material of the vacuum heat-insulating panel at the time of compression molding was in such a range as shown in Inventive Examples 28 to 30 and Inventive Examples 31 to 33, stable and favorable value of heat transfer rate was obtained and the deformation of the core material was small. On the other hand, it was confirmed that, when a core material molded under the pressure out of the range was used, deformation heat transfer rate thereof became unfavorable.

That is, when the pressure was insufficient, the surface of the molded core material did not show a sufficient solidified state. Particularly in Comparative Example 26 in which the content of the inner box material was small, handling difficulty happened. Furthermore, it was confirmed that not only the core material had a fragile and breakable characteristic but also the core material was deformed and contracted by the atmospheric pressure so that its shape could not be well maintained.

Further, when the pressure was too high, the heat transfer rate became unfavorable. This deterioration appeared remarkably in Comparative Example 29 in which the content of the inner box material was large. It is considered that this deterioration occurred for the reason that independent spaces are generated in the inside because of the blockage of communicated portions of cells or because of complete welding of pulverized particles of the inner box, and gas such as air remains therein and leaks therefrom to thereby reduce the degree of vacuum.

Next, the effect of evacuation at the time of compression molding was confirmed. A pellet-like mixture produced by an extruder was put into a mold for molding a flat plate of a size of 180×180 mm. After the mixture was compression-molded in a vacuum atmosphere of $10^{-1}$ Torr under heating at 260° C. for 15 minutes, it was cooled nearly to the room temperature and then taken out as a core material. The composition of the pellet-like mixture used in this case had the same composition ratio for Inventive Examples 31 to 33 as shown in Table 13 and the molding pressure, inclusive of addition of the weight of the mold and the atmospheric pressure at the time of compression molding was in a range from about 1.2 to about 1.5 kg/cm².

Using the core material obtained by the aforementioned method, vacuum heat-insulating panels in which the degree of vacuum in the inside of the packaging material was $10^{-2}$ Torr were produced. After the vacuum heat-insulating panels were aged in an atmosphere of 50° C. for 7 days, their heat transfer rate and external appearance deformation were measured. The results of measurement are shown in Table 15. In Table 15, the vacuum heat-insulating panels using the core materials molded with evacuation were shown as Inventive Examples 34 and 35 and the vacuum heat-insulating panels using the core materials molded without evacuation were shown as Inventive Example 33 and Comparative Example 29.

[Table 15]

From the results, it could be confirmed that within the range of applied pressure as shown in Inventive Examples 34 and 35, the heat transfer rate could be kept in a stable and favorable value by evacuation at the time of compression molding of the core material of the vacuum heat-insulating panel and also that the deformation of the core material was small. For example, though a favorable value of heat transfer rate could be kept in Inventive Example 35, the resin blocked the communicated portions of cells in the core material not subjected to evacuation to cause remarkable increase of the heat transfer rate. This is considered that, even in the case where the communicated portions of cells were blocked, the inside of the cells was kept in a vacuum state as it was, and any gas such as air never remained so that factors to reduce the degree of vacuum were eliminated.

EMBODIMENT 4

Further, the operating performance of a refrigerator using a vacuum heat-insulating material according to the present invention as described in Embodiment 3 was measured and its result was confirmed. A vacuum heat-insulating panel composed of a packaging material having an intermediate layer formed by 8 μm-thick aluminum foil, and a core material used in Inventive Example 23 was used as the vacuum heat-insulating panel to be measured. As shown in FIGS. 8 and 9, the vacuum heat-insulating panel 3a was provided in gaps obtained by fitting outer box 1 formed by bending a thin steel plate outside an inner box 2 formed by vacuum-molding with ABS resin fitted to each other, and stuck to the outer box side. Rigid polyurethane foam 4 was injected into the residual gaps and foamed to fix the panel perfectly. Thus, the residual gaps were filled with the rigid polyurethane foam 4.

Using the heat-insulating box structure thus produced, a refrigerant circuit and so on were disposed so that a 400 L class refrigerator was assembled as Inventive Example 34. On the other hand, another refrigerator was assembled, as Comparative Example 30, by using a heat insulating box structure produced in the same manner as described above by using a vacuum heat-insulating panel using a core material formed from communicated open-cell rigid urethane foam. A further refrigerator was assembled, as Comparative Example 31, by using a heat insulating box in which all gaps between the inner box and the outer box were filled only with rigid polyurethane foam. Electric energy consumed by each of the refrigerators was measured by B method of electric energy consumption test in accordance with JIS-C9607.

[Table 16]

Table 16 shows the results of the measurement. In comparison with the conventional box-specification refrigerator of Comparative Example 31 using only rigid polyurethane foam as a heat insulating material, the refrigerator of Inventive Example 34 using the vacuum heat-insulating panel according to the present invention can operate at the same cooling temperature with less electric energy consumption. Accordingly, it can be said that Inventive Example 34 is excellent in the performance as a heat insulating box structure. Further, it is confirmed that the electric energy consumed by the refrigerator of Inventive Example 34 is substantially equal to the electric energy consumed by the refrigerator of Comparative Example 30 using a vacuum heat-insulating panel using a core material formed from communicated open-cell rigid urethane foam. That is, Inventive Example 34 can secure excellent heat insulating property.

The aforementioned application of the vacuum heat-insulating panel according to the present invention is not limited to the refrigerator shown in those Inventive Examples. For example, the vacuum heat-insulating panel can be applied to heat insulating parts of heat insulating products such as an on-vehicle small-sized refrigerator, a pre-fab type simplified refrigerator, a cold reserving car, a heat reserving material for a piping and a building, etc. Various modifications may be made without departing from the gist of the invention.

TABLE 1

|  | Ex. 1 | Ex. 2 | Ex. 3 | Ex. 4 |
| --- | --- | --- | --- | --- |
| pulverized rigid polyurethan foam | | | | |
| content; vol %/wt % | 94/26 | 90/12 | 94/26 | 94/26 |
| (cell size; μm) | (350) | (350) | (150) | (350) |
| (mean diameter; mm) | (0.8) | (0.8) | (0.4) | (0.8) |
| mica flakes | | | | |
| content; vol %/wt % | 1/28 | 5/66 | 1/28 | 1/28 |
| (mean diameter; mm) | (2.5) | (2.5) | (2.5) | (1.0) |
| epoxyresin (semicured) | | | | |
| content; vol %/wt % | 5/46 | 5/22 | 5/46 | 5/46 |

TABLE 2

|  | Ex. 1 | Ex. 2 | Ex. 3 |
|---|---|---|---|
| heat insulating property; heat transfer rate (kcal/mhK) |  |  |  |
| initial value; 0 day | 0.0064 | 0.0062 | 0.0056 |
| aged value; |  |  |  |
| 50° C. * 3 day | 0.0065 | 0.0063 | 0.0057 |
| 50° C. * 10 day | 0.0066 | 0.0064 | 0.0058 |
| 50° C. * 30 day | 0.0066 | 0.0064 | 0.0058 |
| size change; thickness (mm) (initial value)-(50° C. * 30 day value) | 0.1 | 0.1 | 0.2 |
| side surface deformation; visual observation 50° C. * 30 day | no | no | no |

|  | Ex. 4 | Comp. 1 | Comp. 2 |
|---|---|---|---|
| heat insulating property; heat transfer rate (kcal/mhK) |  |  |  |
| initial value; 0 day | 0.0065 | 0.0081 | 0.0080 |
| aged value; |  |  |  |
| 50° C. * 3 day | 0.0067 | 0.0084 | 0.0082 |
| 50° C. * 10 day | 0.0068 | 0.0086 | 0.0084 |
| 50° C. * 30 day | 0.0068 | 0.0087 | 0.0086 |
| size change; thickness (mm) (initial value)-(50° C. * 30 day value) | 0.1 | 0.5 | 0.4 |
| side surface deformation; visual observation 50° C. * 30 day | no | slight | slight |

TABLE 3

| pulverizing atmosphere | Ex. 3, 5 to 6 Comp. 9 | Comp. 3 to 4 | Comp. 5 to 6 | Comp. 7 to 8 |
|---|---|---|---|---|
| vacuum ($10^{-2}$ Torr) | ○ | x | ○ | x |
| heating (135° C.) | ○ | x | x | ○ |

TABLE 4

|  | size of pulverized particles | | | |
|---|---|---|---|---|
|  | 150 μm | 250 μm | 400 μm | 700 μm |
| classification of described examples | Ex. 3 Comp. 3 Comp. 5 Comp. 7 | Ex. 5 | Ex. 6 Comp. 4 Comp. 6 Comp. 8 | Comp. 9 |

TABLE 5

|  | heat transfer rate | | | |
|---|---|---|---|---|
|  | initial value | aged value (aged in an atmosphere of 50° C.) | | |
|  | 0 day | 3 day | 10 day | 30 day |
| Ex. 3 | 0.0056 | 0.0057 | 0.0058 | 0.0058 |
| Ex. 5 | 0.0059 | 0.0060 | 0.0061 | 0.0061 |
| Ex. 6 | 0.0068 | 0.0069 | 0.0069 | 0.0069 |
| Comp. 3 | 0.0062 | 0.0067 | 0.0078 | 0.0093 |
| Comp. 4 | 0.0080 | 0.0084 | 0.0091 | 0.0104 |
| Comp. 5 | 0.0059 | 0.0065 | 0.0073 | 0.0082 |
| Comp. 6 | 0.0080 | 0.0082 | 0.0085 | 0.0092 |
| Comp. 7 | 0.0060 | 0.0066 | 0.0075 | 0.0087 |
| Comp. 8 | 0.0078 | 0.0084 | 0.0087 | 0.0096 |
| Comp. 9 | 0.0087 | 0.0089 | 0.0091 | 0.0092 |

TABLE 6

|  | Ex. 7 | Ex. 8 | Ex. 9 |
|---|---|---|---|
| number of complex layers | two layers | four layers | seven layers |
| heat insulating property; heat transfer rate (kcal/mhK) |  |  |  |
| initial value; 0 day | 0.0054 | 0.0052 | 0.0049 |
| aged value; |  |  |  |
| 50° C. * 3 day | 0.0055 | 0.0052 | 0.0050 |
| 50° C. * 10 day | 0.0055 | 0.0052 | 0.0051 |
| 50° C. * 30 day | 0.0055 | 0.0052 | 0.0051 |

|  | comp. 10 |
|---|---|
| number of complex layers | — |
| heat insulating property; heat transfer rate (kcal/mhK) |  |
| initial value; 0 day | 0.0073 |
| aged value; |  |
| 50° C. * 3 day | 0.0075 |
| 50° C. * 10 day | 0.0076 |
| 50° C. * 30 day | 0.0077 |

TABLE 7

|  | Ex. 10 | Ex. 3 | Ex. 11 | Ex. 12 |
|---|---|---|---|---|
| loading pressure at compression molding (kg/cm²) | 0.7 | 1.2 | 1.4 | 2.0 |
| size change; thickness (mm) | 0.2 | 0.2 | 0.1 | 0.1 |
| heat insulating property; heat transfer rate (kcal/mhK) | 0.0060 | 0.0056 | 0.0049 | 0.0048 |

|  | Comp. 11 | Comp. 12 |
|---|---|---|
| loading pressure at compression molding (kg/cm²) | 0.3 | 3.5 |
| size change; thickness (mm) | 1.1 | 0.0 |
| heat insulating property; heat transfer rate (kcal/mhK) | 0.0070 | 0.0061 |

TABLE 8

|  | Ex. 13 | Comp. 13 | Comp. 14 |
|---|---|---|---|
| electric energy consumption (kwH/day) | 1.14 | 1.22 | 1.38 |

TABLE 9

|  | Ex. 21 | Ex. 22 | Ex. 23 | Ex. 24 | Comp. 21 |
|---|---|---|---|---|---|
| pulverized rigid polyurethane foam mean particle size | | | | | |
| 500 μm |  | 80 |  | 90 |  |
| 200 μm |  |  | 80 |  | 90 |
| 2000 μm |  |  |  |  | 90 |
| pulverized inner box (ABS resin) mean particle size | | | | | |
| 10 μm |  | 20 | 20 |  |  |
| 3 μm |  |  |  | 10 | 10 | 10 |

(unit: part by weight)

TABLE 10

|  | Ex. 21 | Ex. 22 | Ex. 23 | Ex. 24 |
|---|---|---|---|---|
| heat transfer rate ($10^{-4}$ kcal/mhk) | 62 | 59 | 65 | 61 |
| deformation (visual observation) | no | no | no | no |

|  | comp. 21 | comp. 22 | comp. 23 |
|---|---|---|---|
| heat transfer rate ($10^{-4}$ kcal/mhk) | 125 | 72 | 81 |
| deformation (visual observation) | no | no | no |

TABLE 11

|  | Ex. 25 | Ex. 26 | Ex. 27 | Comp. 24 | Comp 25 |
|---|---|---|---|---|---|
| pulverized rigid polyurethane foam | 90 | 50 | 55 | 92 | 30 |
| pulverized inner box (ABS resin) | 10 | 50 | 45 | 8 | 70 |

(unit: part by weight)

TABLE 12

|  | Ex. 25 | Ex. 26 | Ex. 27 | Comp. 24 | Comp. 25 |
|---|---|---|---|---|---|
| heat transfer rate ($10^{-4}$ kcal/mhk) | 62 | 65 | 67 | — | 113 |
| deformation (visual observation) | no | no | no | no | no |

TABLE 13

|  | Ex. 28 to 30 Comp. 26 to 27 | Ex. 31 to 33 Comp. 28 to 29 |
|---|---|---|
| pulverized rigid polyurethane foam | 80 | 60 |
| pulverized inner box (ABS resin) | 20 | 40 |

(unit: part by weight)

TABLE 14

|  | Ex. 28 | Ex. 29 | Ex. 30 | Comp. 26 | Comp. 27 |
|---|---|---|---|---|---|
| pressure (kg/cm$^2$) | 0.15 | 0.38 | 1.13 | 0.01 | 1.48 |
| heat transfer rate ($10^{-4}$ kcal/mhk) | 52 | 53 | 54 | 56 | 92 |
| deformation (visual observation) | no | no | no | contraction | no |

|  | Ex. 31 | Ex. 32 | Ex. 33 | Comp. 28 | Comp. 29 |
|---|---|---|---|---|---|
| pressure (kg/cm$^2$) | 0.12 | 0.46 | 1.14 | 0.01 | 1.44 |
| heat transfer rate ($10^{-4}$ kcal/mhk) | 60 | 60 | 62 | 69 | 108 |
| deformation (visual observation) | no | no | no | warp | warp |

TABLE 15

|  | Ex. 34 | Ex. 35 | Ex. 33 | Comp. 29 |
|---|---|---|---|---|
| pressure (kg/cm$^2$) | 1.18 | 1.47 | 1.14 | 1.44 |
| heat transfer rate ($10^{-4}$ kcal/mhk) | 55 | 57 | 62 | 108 |
| deformation (visual observation) | no | no | no | warp |

TABLE 16

|  | Ex. 34 | Comp. 30 | Comp. 31 |
|---|---|---|---|
| electric energy consumption (kwH/day) | 1.24 | 1.22 | 1.38 |

I claim:

1. A method for producing a vacuum heat-insulating panel, comprising the steps of:
   pulverizing rigid polyurethane foam at a temperature not lower than the glass transition point of rigid polyurethane foam;
   preparing a core material by compression molding of a mixture containing the pulverized rigid polyurethane foam and a filler in the form of flakes;
   inserting the core material into a packaging material; and
   sealing, in a vacuum, the packaging material.

2. A method for producing a vacuum heat-insulating panel according to claim 1, wherein said pulverized rigid polyurethane foam has a particle size not smaller than the cell size of said polyurethane foam and not larger than three times as large as the cell size.

3. A method for producing a vacuum heat-insulating panel according to claim 1, wherein particles of said pulverized rigid polyurethane foam and said filler are stuck to each other by an adhesive agent of thermosetting resin in a powder form or a thermoplastic resin in a powder form.

4. A method for producing a vacuum-heat insulating panel according to claim 3, wherein a mixture containing said particles of said pulverized rigid polyurethane foam, said plate like filler, and said adhesive agent is put into a mold, and then fine vibration is given thereto before the compression molding.

5. A method for producing a vacuum heat-insulating panel according to claim 1, wherein said compression molding is performed at a temperature not lower than the glass transition point of rigid polyurethane foam and under a compression pressure in a range from 0.7 to 2.0 kg/cm$^2$.

6. A method for producing a vacuum-heat insulating panel according to claim 1, wherein said mixture is put into a mold, and then fine vibration is given thereto before the compression molding.

7. A method for producing a vacuum heat-insulating panel, comprising the steps of:

pulverizing rigid polyurethane foam under heating and in a vacuum atmosphere;

preparing a core material by compression molding of a mixture containing the pulverized rigid polyurethane foam and a filler in the form of flakes;

inserting the core material into a packaging material; and sealing, in a vacuum, the packaging material.

8. A method for producing a vacuum heat-insulating panel according to claim 7, wherein after the pulverizing step but before the preparing step, further comprising the steps of:

putting the mixture into a mold; and vibrating finely the mixture in the mold before compression molding.

9. A method for producing a vacuum heat-insulating panel, comprising the steps of:

pulverizing rigid polyurethane foam at a temperature not lower than the glass transition point;

uniformly mixing the pulverized rigid polyurethane foam and a thermoplastic resin powder to prepare a mixture;

compression-molding said mixture to form a core material;

inserting said core material into a packaging material; and sealing, in a vacuum, said packaging material.

10. A method for producing a vacuum heat-insulating panel according to claim 9, wherein said thermoplastic resin powder is pulverized styrene resin.

11. A method for producing a vacuum heat-insulating panel according to claim 10, wherein said compression molding is performed at a temperature not lower than the glass transition point of said rigid polyurethane foam and not lower than the melting point of said thermoplastic resin.

12. A method for producing a vacuum heat-insulting panel according to claim 9, wherein said pulverized rigid polyurethane foam has a particle size not smaller than the cell size of said rigid polyurethane foam and not larger than three times as large as the cell size, and said thermoplastic resin has a particle size not smaller than the cell size of said rigid polyurethane foam.

13. A method for producing a vacuum heat-insulating panel according to claim 9, wherein said compression molding is performed in a vacuum atmosphere and under a compression pressure in a range from 0.1 to 1.2 kg/cm$^2$.

* * * * *